United States Patent
Kawakami et al.

(10) Patent No.: US 6,876,434 B2
(45) Date of Patent: Apr. 5, 2005

(54) MOTION PICTURE REPRODUCING MIDDLEWARE SELECTING/EXECUTING DEVICE AND METHOD

(75) Inventors: Yoshio Kawakami, Kadoma (JP); Yasushi Waki, Soraku-gun (JP); Takakazu Shiomi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 344 days.

(21) Appl. No.: 10/203,109
(22) PCT Filed: Sep. 13, 2001
(86) PCT No.: PCT/JP01/07932
§ 371 (c)(1), (2), (4) Date: Aug. 6, 2002
(87) PCT Pub. No.: WO02/47378
PCT Pub. Date: Jun. 13, 2002

(65) Prior Publication Data
US 2003/0011749 A1 Jan. 16, 2003

(30) Foreign Application Priority Data
Dec. 7, 2000 (JP) ......................................... 2000-372634

(51) Int. Cl.$^7$ ..................... G03B 21/00; H04N 7/173; H04N 7/16
(52) U.S. Cl. ..................... 352/244; 725/132; 725/139; 725/151
(58) Field of Search ........................... 725/68, 69, 100, 725/131, 132, 139, 140; 352/244

(56) References Cited

U.S. PATENT DOCUMENTS

2004/0139483 A1 * 7/2004 Kim et al. .................. 725/138

FOREIGN PATENT DOCUMENTS

| JP | 11-88419 | 3/1999 |
| JP | 2001-54095 | 2/2001 |
| JP | 2001-197048 | 7/2001 |

* cited by examiner

Primary Examiner—Rodney Fuller
Assistant Examiner—Arthur A Smith
(74) Attorney, Agent, or Firm—Wenderoth, Lind & Ponack, L.L.P.

(57) ABSTRACT

Achieved is a motion picture reproducing apparatus at low price (being little increased in price even though the number of specifications are increased) capable of receiving motion picture streams complying with various specifications such as those containing programs that operate on different pieces of middleware, and reproducing motion pictures. A middleware storage unit 43 stores a plurality of different pieces of middleware. Based on program identification information contained in a motion picture stream received by the motion picture reproducing apparatus, an applicable middleware selecting unit 40 selects middleware applicable to a program contained in the motion picture stream. A middleware reading unit 41 reads the selected applicable middleware from the middleware storage unit 43. A middleware executing unit 42 executes the read middleware.

19 Claims, 14 Drawing Sheets

MOTION PICTURE REPRODUCING MIDDLEWARE SELECTING/EXECUTING DEVICE AND METHOD

TECHNICAL FIELD

The present invention relates to motion picture reproducing apparatuses for reproducing a motion picture stream and, more specifically, to a middleware executing device used for a motion picture reproducing apparatus for reproducing motion pictures by receiving a motion picture stream that contains a program and operating the program on middleware, the middleware executing device making the program operable by executing middleware applicable to the program.

BACKGROUND ART

In recent years, specifications as to motion picture streams for motion picture reproducing apparatuses have been actively developed. For example, in Japan, there is a specifications for BS digital, and in Europe, there is the one for DVB-MHP (ETSI TS 101 812 V1.1.1 (2000-07) Digital Video Broadcasting (DVB); Multimedia Home Platform (MHP) Specification 1.0), and others.

In every specification, a motion picture stream contains a program. In order for a motion picture reproducing apparatus to operate the program for reproducing motion pictures, dedicated middleware is required. One example of middleware for BS digitalis a BML browser. One example of middleware for DVB-MHP is a Java (a registered trademark of Sun Microsystems, Inc.) (hereinafter, Java VM)

That is, the program contained in the motion picture stream based on the BS digital specification is operated on a BML browser, but not on a JavaVM. Conversely, the program contained in the motion picture stream based on the DVB-MHP specification is operated on a JavaVM, but not on a BML browser.

Furthermore, as in the above-described examples in Japan and Europe, under such circumstances as that difference areas adopt motion picture streams of different specifications, conventional motion picture reproducing apparatuses have been respectively constructed so as to handle motion picture streams based on a single specification. For example, a motion picture reproducing apparatuses destined for Japan has a BML browser incorporated therein as middleware to handle only motion picture streams based on the BS digital specification. On the other hand, a motion picture reproducing apparatus destined for Europe has a JavaVM incorporated therein to handle only motion picture streams based on the DVB-MHP specification.

At present, it does not occur so often that motion picture streams based on a plurality of specifications are broadcast in a single area. In the near future, however, with new broadcast companies entering into the market, etc., motion picture streams based on a plurality of different specifications may possibly be broadcast in the same area. Moreover, even if one-area-one-specification is maintained, the specification may be changed. In such case, until the change of the specification to the new one is completed, motion picture streams based on two specifications, the old one and the new one, may possibly be broadcast.

If the situation becomes such that motion picture streams based on a plurality of different specifications are broadcast, the conventional motion picture reproducing apparatus constructed so as to handle motion picture streams based on only a single specification cannot reproduce motion picture streams based on other specifications.

Note that, an easiest way for solving such an inconvenience is to integrate a plurality of conventional motion picture reproducing apparatuses for handling motion picture streams of different specifications into one. However, merely incorporating them into one causes an increase in size and cost of the apparatus in proportion to the number of specifications.

Therefore, another method can be thought, where, in the conventional motion picture reproducing apparatus handling motion picture streams of a single specification, middleware that becomes required is newly incorporated, and a plurality of pieces of middleware are simultaneously executed, thereby enabling the motion picture streams based on the plurality of specifications to be reproduced. For this purpose, however, the motion picture reproducing apparatus has to be provided in advance with resources enough to simultaneously execute all pieces of middleware including the newly-incorporated middleware, or has to be additionally provided with resources for covering a shortfall. Therefore, also in this case, as the number of specifications is increased, the apparatus becomes increased in cost.

DISCLOSURE OF THE INVENTION

Therefore, an object of the present invention is to achieve a middleware selecting and executing device of for motion picture reproduction, the device used for a motion picture reproducing apparatus for reproducing motion pictures by receiving motion picture streams of different streams such as those containing programs that operate on different pieces of middleware, the device being inexpensive (not being increased in cost even though the number of specifications is increased) and making the program operable by selectively executing middleware applicable to the program.

To solve the problems mentioned above, the present invention has the following aspects.

A first aspect of the present invention is directed to a middleware selecting and executing device for motion picture reproduction used in a motion picture reproducing apparatus that reproduces motion pictures by receiving a motion picture stream containing motion picture data, a program, and program identification information sent out from a broadcast station, and operating the program on middleware based on the program identification information to process the motion picture data, the device selectively executing middleware applicable to the program to make the program operable, the device comprising:

middleware storage means that stores a plurality of pieces of middleware that are different from each other;

selecting means for selecting, based on the program identification information in the motion picture stream received by the motion picture reproducing apparatus, the middleware applicable to the program in the motion picture stream;

reading means for reading the middleware selected by the selecting means from the middleware storage means; and executing means for executing the middleware read by the reading means.

In the above first aspect, the middleware selecting and executing device for motion picture reproduction (hereinafter, middleware selecting and executing device) stores therein a plurality of pieces of middleware. When a motion picture stream is sent from the broadcast station, the device selects, from the plurality of pieces of middleware stored therein, middleware applicable to a program contained in the motion picture stream for execution. Therefore, the motion picture reproducing apparatus can receive motion picture streams of various specifications such as those containing programs that operate on different pieces of middleware to reproduce motion pictures.

Here, receiving the motion picture streams of various specifications to enable motion pictures reproducible in the above-described manner can also be achieved by integrating a plurality of motion picture reproducing apparatuses respectively receiving motion picture streams of only a single specification, or by adding new resources to the motion picture reproducing apparatus to simultaneously execute the plurality of pieces of middleware. In these schemes, however, as the number of specifications of reproducible motion picture streams is increased, the price of the apparatus becomes increased in proportion to the number of specifications. For the present middleware selecting and executing device, on the other hand, resources enough to execute only a single piece of middleware will do regardless of the number of specifications. Therefore, even when the number of specifications is increased, the price is little increased.

According to a second aspect, in the first aspect,
when the middleware selected by the selecting means is not stored in the middleware storage means, the reading means reads the middleware from an external server via a network.

In the above second aspect, when not holding the middleware applicable to the program contained in the incoming motion picture stream, the middleware selecting and executing device reads the middleware from the external server via the network for execution. By thus using the middleware on the network, the number of specifications of reproducible motion picture streams can be dramatically increased.

According to a third aspect, in the second aspect,
the reading means
additionally stores the middleware read from the external server via the network in the middleware storage means; and
when the middleware is again selected by the selecting means, reads the middleware from the middleware storage means.

In the above third aspect, the middleware selecting and executing device holds therein the middleware that has been externally read and executed. Then, when the middleware is again required, the device reads the middleware held therein for execution. Therefore, time required for reading can be reduced and, as a result, the motion picture reproducing apparatus can quickly start motion picture reproduction.

According to a fourth aspect, in the first aspect,
the device further includes adding means for additionally storing new middleware provided by the broadcast station in the middleware storage means.

In the above fourth aspect, when provided with new middleware by the broadcast station, the middleware selecting and executing device additionally stored therein the middleware. Thus, it is possible through broadcasting to increase the number of specifications of motion picture streams reproducible by the motion picture reproducing apparatus.

According to a fifth aspect, in the fourth aspect,
the broadcast station further sends out an operation stream containing middleware, a middleware adding program, and program identification information, and
the adding means is implemented by the motion picture reproducing apparatus receiving the operation stream and operating, based on the program identification information, the middleware adding program on middleware applicable to the middleware adding program.

In the above fifth aspect, the middleware, the program for adding the middleware (middleware adding program), and the identification information of the program are sent as being contained in a single stream (operation stream). On receiving the operation stream, the middleware selecting and executing device selects, based on the program identification information, the middleware applicable to the middleware adding program for execution. Then, with the middleware adding program operating on the middleware being executed, the middleware selecting and executing device can additionally store therein new middleware.

According to a sixth aspect, in the first aspect,
the program identification information in the motion picture stream contains middleware code indicating to which middleware the program in the motion picture stream is applicable, and
the reading means
holds a correspondence list containing, for each executable middleware, middleware code and a storage location thereof in relation to each other, and
when reading the middleware selected by the selecting means, extracts the middleware code from the program identification information in the stream received by the motion picture reproducing apparatus for comparison with the correspondence list to specify the storage location of the middleware.

In the above sixth aspect, the program identification information sent together with the program contains middleware code indicating to which middleware the program is applicable. The middleware selecting and executing device holds a correspondence list having a correspondence relation between the code and the storage location of the respective executable middleware. The middleware selecting and executing device extracts the middleware code from the program identification information for comparison with the correspondence list, thereby specifying the storage location of the middleware applicable to the program. Thus, the middleware selecting and executing device can read the middleware applicable to the program for execution.

According to a seventh aspect, in the sixth aspect,
the device further includes correspondence-list revising means for making revision so as to additionally write middleware code and a storage location of new middleware in the correspondence list held by the reading means.

In the above seventh aspect, when new middleware is added, the middleware selecting and executing device makes revision so as to add the middleware code and the storage location of the middleware to the correspondence list. Thereafter, the motion picture reproducing apparatus refers to the revised correspondence list, thereby specifying the storage location of the new middleware. Thus, it is possible to increase the number of specifications of motion picture streams executable by the motion picture reproducing apparatus.

According to an eighth aspect, in the seventh aspect,
the broadcast station further sends out an operation stream containing the middleware code and the storage location of the new middleware, a correspondence-list revising program, and program identification information, and
the correspondence-list revising means is implemented by the motion picture reproducing apparatus receiving the operation stream, and operating, based on the program identification information, the correspondence-list revising program on middleware applicable to the correspondence-list revising program.

In the above eighth aspect, the middleware code and storage location of the new middleware, a program for making revision so as to add the code and the storage location of the middleware to the correspondence list (correspondence-list revising program), and the identification information of the program are sent as being contained in a single stream (operation stream). On receiving the operation stream, the middleware selecting and executing device selects, based on the program identification information, the middleware applicable to the correspondence-list revising program for execution. Then, with the correspondence-list revising program operating on the middleware being executed, the motion picture reproducing apparatus can make revision so as to add the code and the storage location of the new middleware to the correspondence list.

According to a ninth aspect, in the sixth aspect, the device further includes adding means for additionally storing new middleware provided by the broadcast station in the middleware storage means; and correspondence-list revising means for making, in accordance with the new middleware additionally stored in the middleware storage means, revision so as to additionally write middleware code and a storage location of the new middleware in the correspondence list held by the reading means.

In the above ninth aspect, when the new middleware is provided by the broadcast station together with the code and the storage location of the middleware, the middleware selecting and executing device additionally stores therein the middleware, and also adds the code and the storage location of the middleware to the correspondence list. Thus, it is possible through broadcasting to increase the number of specifications of motion picture streams reproducible by the motion picture reproducing apparatus.

According to a tenth aspect, in the ninth aspect, the broadcast station further sends an operation stream containing the new middleware, a middleware adding program, the middleware code and the storage location of the new middleware, a correspondence-list revising program and program identification information, and the adding means and the correspondence-list revising means are implemented by the motion picture reproducing apparatus receiving the operation stream and operating, based on the program identification information, the middleware adding program and the correspondence-list revising program on middleware applicable to the middleware adding program and the correspondence-list revising program.

In the above tenth aspect, new middleware, the program for adding the middleware (middleware adding program), and the code and the storage location of the middleware, the program for making revision so as to add the code and storage location of the middleware to the correspondence list (correspondence-list revising program), and the identification information of these programs are sent as being contained in a single stream (operation stream). On receiving the operation stream, the middleware selecting and executing device selects, based on the program identification information, the middleware applicable to the middleware adding program and the correspondence-list revising program for execution. Then, with the middleware adding program operating on the middleware being executed, the middleware selecting and executing device can additionally store therein new middleware. Furthermore, with the correspondence-list revising program operating on the middleware being executed, it is possible to make revision for adding the code and the storage location of the new middleware to the correspondence list.

According to an eleventh aspect, in the first aspect, the device further includes priority storage means for storing information indicating a priority of each executable middleware, wherein when the motion picture stream contains a plurality of programs having the same function and operating on different pieces of middleware and any one of the plurality of programs is selected by the motion picture reproducing apparatus for operation, the reading means refers to the information in the priority storage means to read middleware having a highest priority.

In the above eleventh aspect, a single motion picture stream may contain a plurality of programs having the same function but differing in applicable middleware (in this case, the motion picture reproducing apparatus is required only to operate any one of these plurality of programs). The middleware selecting and executing device holds priority information indicating priorities of the respective middleware and, based on the priority information, reads the middleware having a highest priority for execution. In response, the motion picture reproducing apparatus operates a program applicable to the middleware on the middleware having the highest priority being executed. Thus, the broadcast station side can cause the motion picture reproducing apparatus to execute the program applicable to the specific middleware with priority.

According to a twelfth aspect, in the eleventh aspect, when an instruction from the user is inputted to the motion picture reproducing apparatus, the priority storage means changes the stored priority information.

In the above twelfth aspect, the middleware selecting and executing device changes the priority information in response to an instruction from the user. That is, the user can freely designate the middleware to be executed with priority.

According to a thirteenth aspect, in the eleventh aspect, the device further includes priority changing means for changing the priority information stored in the priority storage means into new priority information provided by the broadcast station.

In the above thirteenth aspect, the middleware executing device changes the priority according to an instruction sent from the broadcast station. That is, the middleware to be executed with priority can be designated by the broadcast station side.

According to a fourteenth aspect, in the thirteenth aspect, the broadcast station further sends out an operation stream containing the new priority information, a priority changing program, and program identification information, and the priority changing means is implemented by the motion picture reproducing apparatus receiving the operation stream and operating, based on the program identification information, the priority changing program on middleware applicable to the priority changing program.

In the above fourteenth aspect, new priority information, the program for changing the priority information (priority changing program), and the identification information of the program are sent as being contained in a single stream (operation stream). On receiving the operation stream, the middleware selecting and executing device selects, based on the program identification information, the middleware applicable to the priority changing program for execution. Then, with the priority changing program operating on the middleware being executed, the middleware selecting and executing device can change the priority information (to the new priority information).

According to a fifteenth aspect, in the first aspect,
when the motion picture stream contains a plurality of programs corresponding to different broadcast services, the motion picture reproducing apparatus selects any one of the broadcast services and operates a program corresponding to the broadcast service, and
the device further includes a service switch detecting means for detecting, with the program that corresponds to the broadcast service operating on middleware applicable to the program, that the program instructs the motion picture reproducing apparatus to switch to another broadcast service, and requesting the selecting means to select middleware applicable to a program corresponding to the other broadcast service.

In the above fifteenth aspect, the motion picture stream may contain a plurality of programs that correspond to different broadcast services (in this case, the motion picture reproducing apparatus is required only to select any one of the broadcast services, and to operate a program corresponding to the service). With the program that corresponds to the broadcast service operating on the middleware applicable to the program, the program instructs the motion picture reproducing apparatus to switch to another broadcast service. The middleware selecting and executing device detects this instruction of switching to the other broadcast service, and selects middleware applicable to the program corresponding to the other broadcast service.

As such, while the motion picture reproducing apparatus is reproducing motion pictures of a certain broadcast service, when the program corresponding to the broadcast service issues an instruction of switching to another broadcast service, the middleware selecting and executing device detects this instruction, and selects middleware as applicable to the program corresponding to the other broadcast service for execution. With this, the motion picture reproducing apparatus can cause the program corresponding to the other broadcast service to operate on the middleware applicable to the program. As a result, the broadcast service is switched, thereby starting reproduction of motion pictures of the other broadcast service.

According to a sixteenth aspect, in the first aspect,
when the middleware being executed is terminated, the executing means releases resources allocated for the middleware.

In the above sixteenth aspect, when the middleware being executed is terminated, the resources used by the middleware are released. Thus, the middleware to be executed next can use the same resources. Therefore, only with the amount of resources that may be used by a single piece of middleware, the middleware selecting and executing device can selectively execute a plurality of pieces of middleware.

A seventeenth aspect is directed to, in a motion picture reproducing apparatus that reproduces motion pictures by receiving a motion picture stream containing motion picture data, a program, and program identification information sent out from a broadcast station, and operating the program on middleware based on the program identification information to process the motion picture data, a method of selectively executing middleware applicable to the program to make the program operable, the method including:

a middleware storing step of storing a plurality of pieces of middleware that are different from each other;

a selecting step of selecting, based on the program identification information in the motion picture stream received by the motion picture reproducing apparatus, the middleware applicable to the program in the motion picture stream;

a reading step of reading the middleware selected in the selecting step from the plurality of pieces of middleware stored in the middleware storing step; and an executing step of executing the middleware read in the reading step.

An eighteenth aspect is directed to a middleware selecting and executing program for a motion picture reproducing apparatus, the program having a method as in the seventeenth aspect computer-readably written therein.

A nineteenth aspect is directed to a recording medium having a middleware selecting and executing program for a motion picture reproducing apparatus as in the eighteenth aspect stored therein.

BEST MODE FOR CARRYING OUT THE INVENTION

Hereinafter described are embodiments of the present invention with reference to the drawings.

Figure 1:
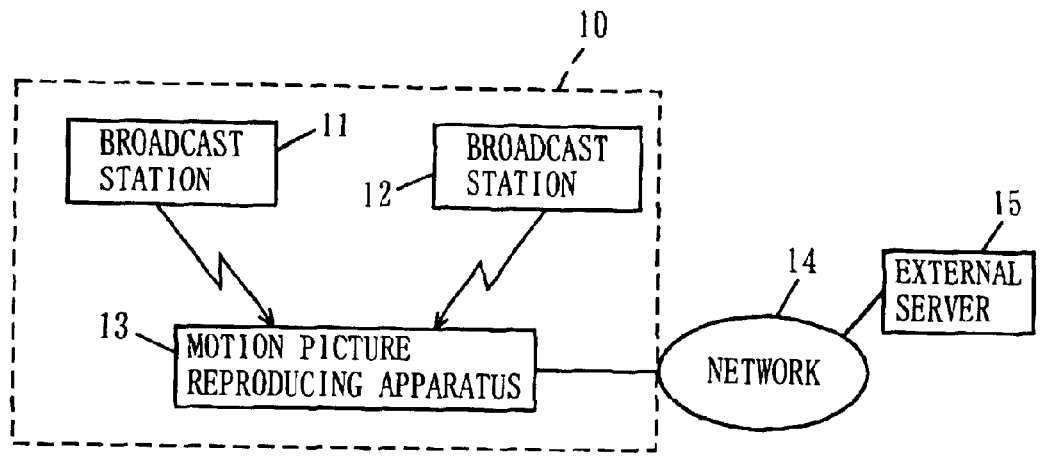
FIG. 1 is a block diagram illustrating an example construction of a broadcast system to which the present invention is applied.

FIG. 1 is a block diagram illustrating the construction of a broadcast system to which the present invention is applied. In FIG. 1, a broadcast system 10 is constructed by two broadcast stations 11 and 12 that send out motion picture streams (for example, MPEG-2 transport streams), and a motion picture reproducing apparatus 13 that receives the motion picture streams sent out from the respective broadcast stations 11 and 12 for motion picture reproduction. The motion picture reproducing apparatus 13 is connected to a network 14, always or as required, and can also obtain information through the network 14 from outside of the system (for example, an external server 15).

The two broadcast stations 11 and 12 send out motion picture streams based on different specifications from each other. That is, the first broadcast station 11 sends out motion picture streams based on a first specification (for example, DVB-MHP specification), that is, motion picture streams containing a program operated on first middleware (for example, JavaVM). The second broadcast station 12, on the other hand, sends out motion picture streams based on a second specification (for example, BS digital specification), that is, motion picture streams containing a program operated on second middleware (for example, BML browser).

Figure 2:
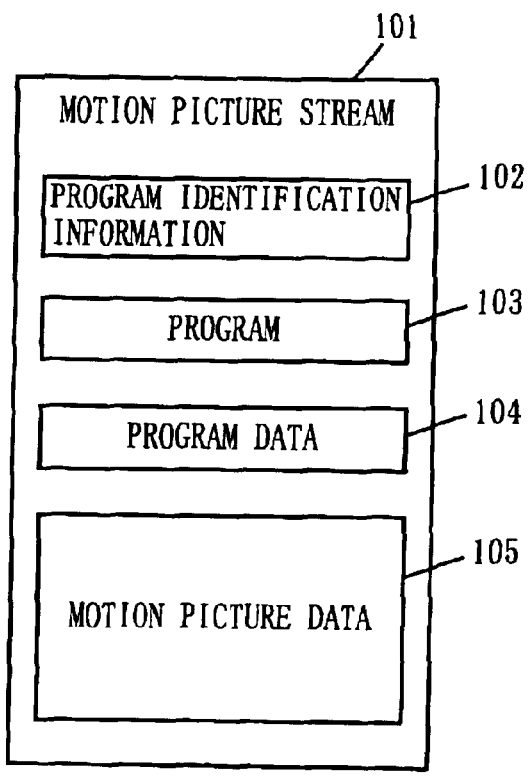
FIG. 2 is an illustration showing the contents of a motion picture stream sent from broadcast stations 11 and 12 of FIG. 1.

Here, motion picture streams are described. FIG. 2 is an illustration for showing the contents of a motion picture stream sent out from the respective broadcast stations 11 and 12 of FIG. 1. In FIG. 2, a motion picture stream 101 contains motion picture data 105, a program 103 for processing the motion picture data 105 to generate video, program data 104 used by the program 103, and program identification information 102 for identifying the program 103.

The program 103 is written in a specific programming language (for example, Java language or BML), operating only on specific middleware corresponding to the language (for example, JavaVM or BML browser). The program identification information 102 includes information indicating on which middleware the program 103 operates (hereinafter referred to as middleware code) For example, when the motion picture stream 101 is an MPEG-2 transport stream, PSI (Program Specific Information) corresponds to the program identification information 102, and this PSI includes data corresponding to middleware code. The program data 104 includes data for displaying characters, still pictures, an others.

Referring back to FIG. 1, the motion picture reproducing apparatus holds a plurality of pieces of middleware for operating the programs 103 written in different languages from each other (for example, Java language and BML), and has a function of selecting, from these plurality of pieces of middleware, middleware applicable to the program 103 in the received motion picture stream 101, and executing the middleware. In other words, depending on which middleware the incoming program 103 operates on, the middleware is switched among these plurality of pieces of middleware.

With this middleware selecting and executing function (or middleware switching function), the motion picture reproducing apparatus 13 can execute the middleware applicable to the program 103 and operates the program 103 on the middleware, even if the program 103 contained in the motion picture stream 101 operates on whichever middleware. With the program 103 thus operating, the motion picture reproducing apparatus 13 can process the motion picture data 105 to reproduce motion pictures. Also, with the operation of the program 103, the motion picture reproducing apparatus 13 can process the program data 104 to display characters and still pictures.

Figure 3:
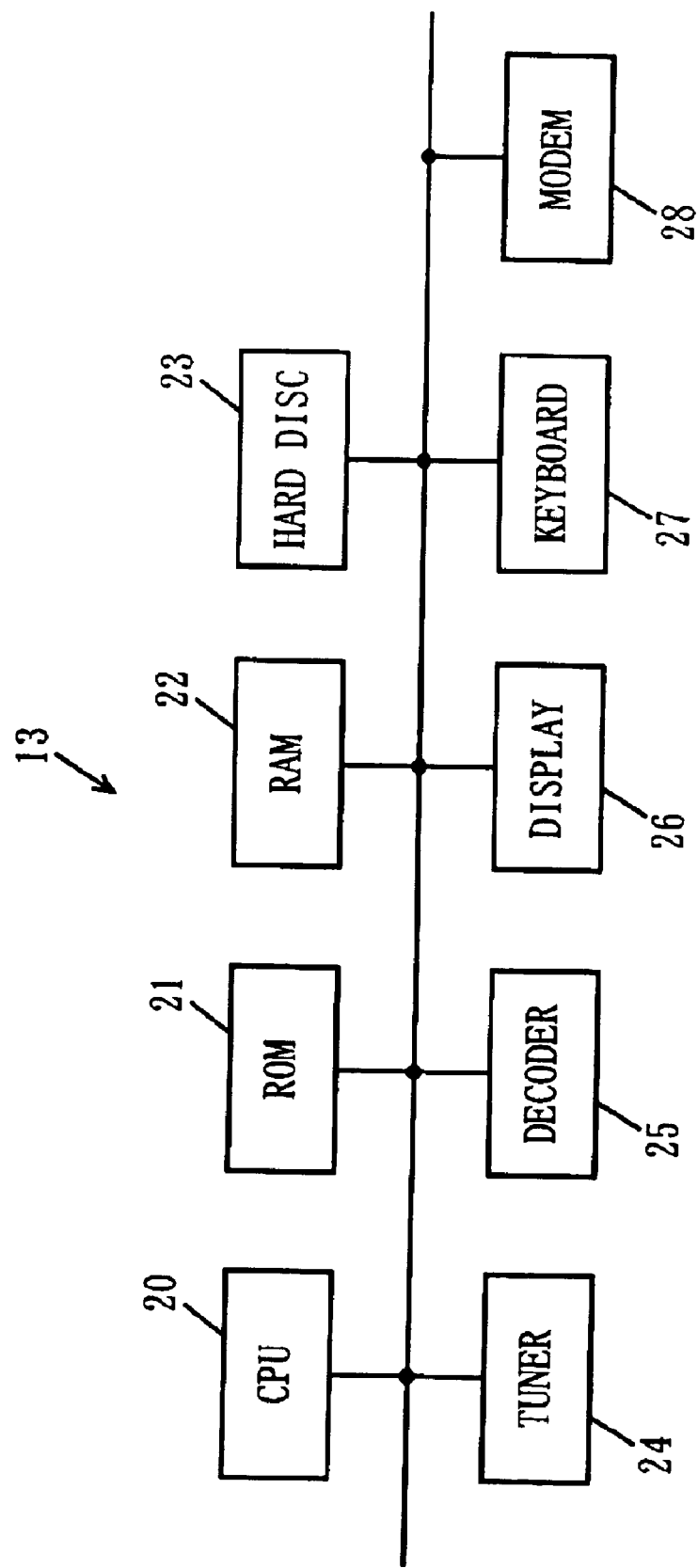
FIG. 3 is a block diagram illustrating an example construction of hardware for achieving a motion picture reproducing apparatus 13 having a middleware selecting and executing function according to the present invention.

FIG. 3 is a block diagram illustrating an construction of hardware for achieving the motion picture reproducing apparatus 13 having the above middleware selecting and executing function. In FIG. 3, the motion picture reproducing apparatus 13 is achieved by a CPU 20, ROM 21, RAM 22, a hard disc 23, a tuner 24, a decoder 25, a display 26, a modem 28, and a keyboard 27. The hard disc 23 stores a plurality of pieces of middleware and a middleware selecting and executing program. Based on these plurality of pieces of middleware and middleware selecting and executing program, the CPU 20 operates while using the RAM 22 as a working area, thereby enabling the motion picture reproducing apparatus 13 to carry out the above middleware selecting and executing processing.

The middleware selecting and executing program is previously stored in the ROM 21 when the motion picture reproducing apparatus 13 is shipped. Alternatively, the program may be provided as being stored in a portable recording medium such as CD-ROM, may be provided as being contained in the motion picture stream 101 sent out from the broadcast stations 11 and 12, or may be provided through the network 14 from the external server 15. The middleware selecting and executing program provided by either of the above schemes is stored in the hard disc 23 (may be stored in the ROM 21 if the ROM 21 is a writable non-volatile memory), and is read when required.

Each middleware is previously stored in the hard disc 23 when the motion picture reproducing apparatus 13 is shipped. Alternatively, the middleware may be previously stored in the ROM 21 together with the middleware selecting and executing program when the motion picture reproducing apparatus 13 is shipped. Still alternatively, the middleware may be provided as being stored in a portable recording medium such as CD-ROM, may be provided as being contained in the motion picture stream 101 sent out from the broadcast stations 11 and 12, or may be provided through the network 14 from the external server 15. The middleware provided by either of the above schemes is stored in the hard disc 23 (or ROM 21), and is read when required.

Also, when not holding the middleware applicable to the program 103 contained in the received motion picture stream 101, the motion picture reproducing apparatus 13 can also obtain the middleware applicable to the program 103 from the external server 15 (this external server 15 stores various pieces of middleware) through the modem 28 via the network 14. The middleware obtained via the network 14 is stored in the hard disc 23 (or the ROM 21) in the motion picture reproducing apparatus 13.

Note that the hardware construction illustrated in FIG. 3 is a typical example, and does not limit the components to those illustrated therein. For example, the ROM 21 and the hard disc 23 are used in FIG. 3 as media that store the middleware or various programs, but other storage media such as a memory card and an optical disc can be used for implementation. Also, the modem 28 is used as a device that connects the motion picture reproducing apparatus 13 and the network 14, but another network connecting device such as a terminal adaptor can be used for implementation.

FIG. 1 illustrates, as a simplest example, the broadcast system 10 in which the two broadcast stations 11 and 12 send out motion picture streams based on different specifications from each other. The system to which the present invention is applicable is, however, not limited to the above system. Even when used for such a broadcast system as that in which three or more broadcast stations send out motion picture streams based on different specifications from one another, the motion picture reproducing apparatus 13 similarly carries out the middleware selecting and executing processing, except that the number of pieces of middleware to be held is increased.

Alternatively, such a broadcast system may be possible as that in which a single broadcast station sends out the motion picture stream 101 based on a plurality of specifications different from each other. For example, a single broadcast station may send out two types of motion picture streams, that is, a motion picture stream of the DVB-MHP specification and a motion picture stream of the BS digital specification. Also when used for such broadcast system, the motion picture reproducing apparatus 13 similarly carries out the middleware selecting and executing processing.

Hereinafter described in detail are several embodiments of the motion picture reproducing apparatus 13 having the middleware selecting and executing function as described above.

First Embodiment

Figure 4:
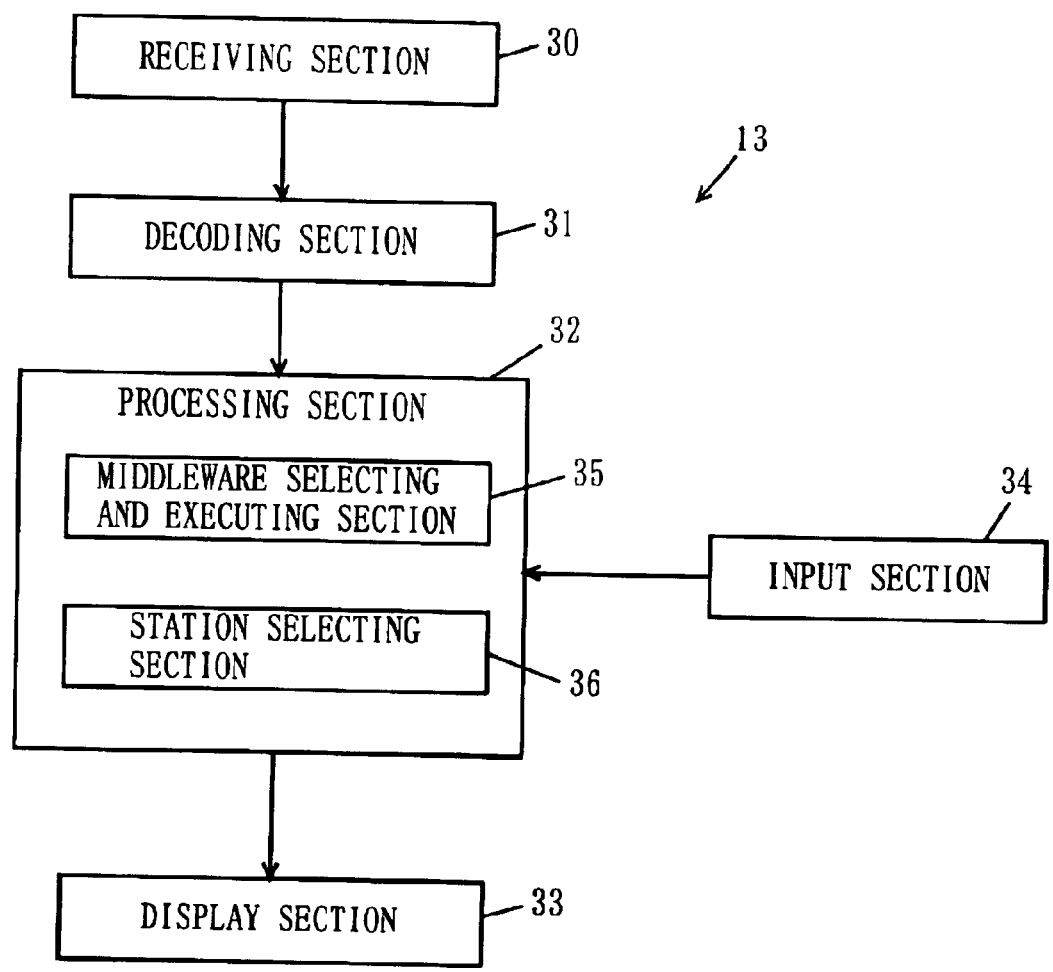
FIG. 4 is a block diagram illustrating the entire construction of the motion picture reproducing apparatus 13 according to a first embodiment of the present invention (this diagram is also cited for second through sixth embodiments).

FIG. 4 is a block diagram illustrating the entire construction of the motion picture reproducing apparatus 13 according to a first embodiment of the present invention. In FIG. 4, the present motion picture reproducing apparatus 13 includes a receiving section 30, a decoding section 31, a processing section 32, a display section 33, and an input section 34. The receiving section 30 receives the motion picture stream 101 (refer to FIG. 2) sent in electric wave form from the broadcast stations 11 and 12. The motion picture stream 101 is, for example, an MPEG-2 transport stream. The decoding section 31 decodes the motion picture stream 101 received by the receiving section 30. The processing section 32 processes the stream 101 decoded by the decoding section 31 to reproduce motion pictures. The display section 33 displays the motion pictures reproduced by the processing section 32. The input section 34 accepts an operation signal from a user, and transfers it to the processing section 32.

The processing section 32 includes a station selecting section 36 and a middleware selecting and executing section 35. The station selecting section 36 selects a station in response to the operation signal from the input section 34. The middleware selecting and executing section 35 has a plurality of pieces of middleware, and when the motion picture stream 101 sent out from the broadcast station selected by the station selecting section 36 is inputted to the processing section 32, selects and executes middleware applicable to the program 103 contained in the motion picture stream 101.

Figures 5, 6:
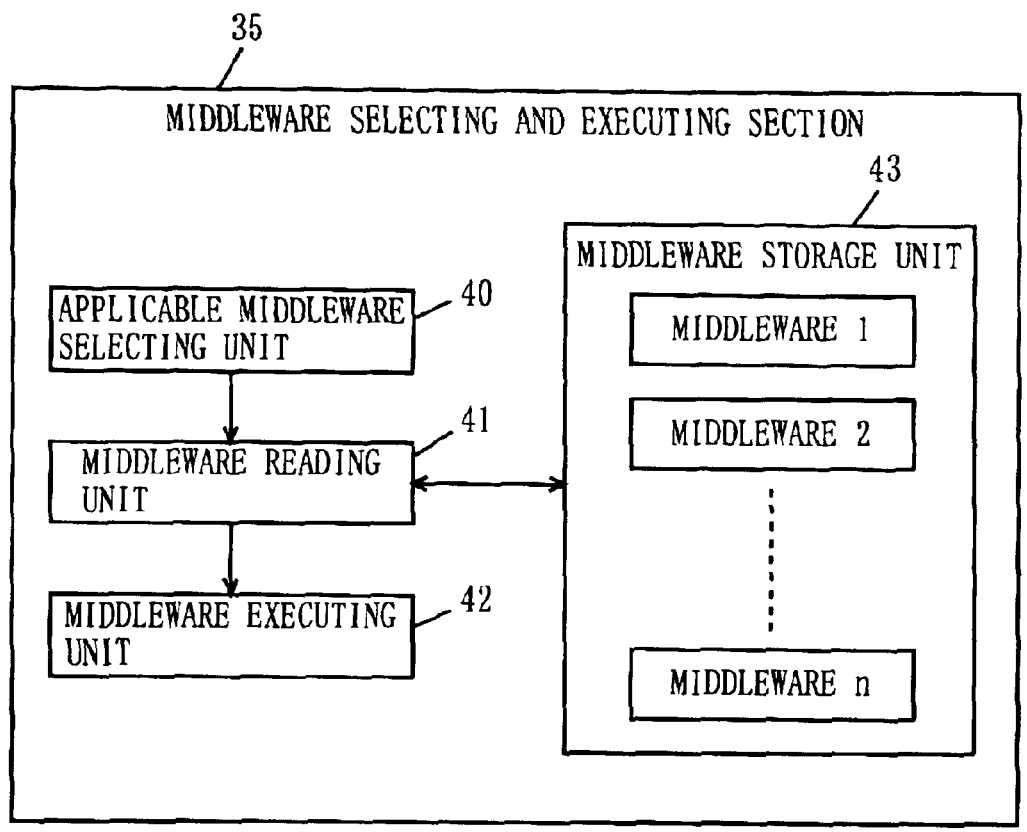
FIG. 5 is a block diagram illustrating an example construction of a middleware selecting and executing section 35 of FIG. 4 (first embodiment).
FIG. 6 is an illustration showing an example of a correspondence list held by a middleware reading unit 41 of FIG. 5.

FIG. 5 is a block diagram illustrating an example of construction of the middleware selecting and executing section 35 In FIG. 5, the middleware selecting and executing section 35 includes an applicable middleware selecting unit 40, a middleware reading unit 41, a middleware executing unit 42, and a middleware storage unit 43. The middleware storage unit 43 stores the plurality of pieces of middleware (middleware 1, middleware 2, . . . , middleware n). For example, a JavaVM and a BML browser are stored.

When the motion picture stream 101 is inputted to the processing section 32, the applicable middleware selecting unit 40 selects, based on the program identification information 102 contained in the motion picture stream 101, middleware applicable to the program contained in the motion picture stream 101, and reports the selection result to the middleware reading unit. Specifically, extracted first from the motion picture stream 101 is the program identification information 102, from which middleware code is then extracted. The code is reported to the middleware reading unit 41.

The middleware reading unit 41 reads, from the middleware storage unit 43, the middleware selected by the applicable middleware selecting unit 40. Specifically, the middleware reading unit 41 holds, for example, a correspondence list as illustrated in FIG. 6. In FIG. 6, a correspondence list 201 contains, for every middleware executable by the present motion picture reproducing apparatus 13, its middleware code (identifier) and storage location (address or URL) in relation to each other.

When receiving the report of the middleware code from the applicable middleware selecting unit 40, the middleware reading unit 41 refers to the correspondence list as illustrated in FIG. 6 to specify the middleware code and its corresponding storage location, and reads the middleware from that location.

For example, when the middleware code of the program 103 contained in the motion picture stream 101 inputted to the processing section 32 is "A" (that is, when the program 103 operates on middleware "A"), the middleware reading unit 41 refers to FIG. 5 to read the middleware from the storage location "MW_01" that corresponds to "A".

The correspondence list may contain, not only the information about middleware held by the motion picture reproducing apparatus 13 itself (that is, stored by the middleware storage unit 43), but also information about middleware stored in the external server 15 (middleware code and URL of the external server 15). In this case, the middleware reading unit 41 can read the middleware from the external server 15 via the network 14. The middleware read from outside is stored in the middleware storage unit 43. Thus, when the same middleware is required again, the middleware reading unit 41 can read it from the middleware storage unit 43, thereby reducing time required for reading the middleware and enabling quick start of reproduction.

The middleware executing unit 42 executes the middleware read by the middleware reading unit 41. Furthermore, when execution of the middleware is terminated, the middleware executing unit 42 releases the resources that have been used by the middleware (for example, the storage area in the RAM 22, the tuner 24, the decoder 25, and others). This is to make the resources available for the middleware to be executed next.

With reference to a flowchart of FIG. 7, described below is the operation of the above-constructed motion picture reproducing apparatus 13.

Figure 7:
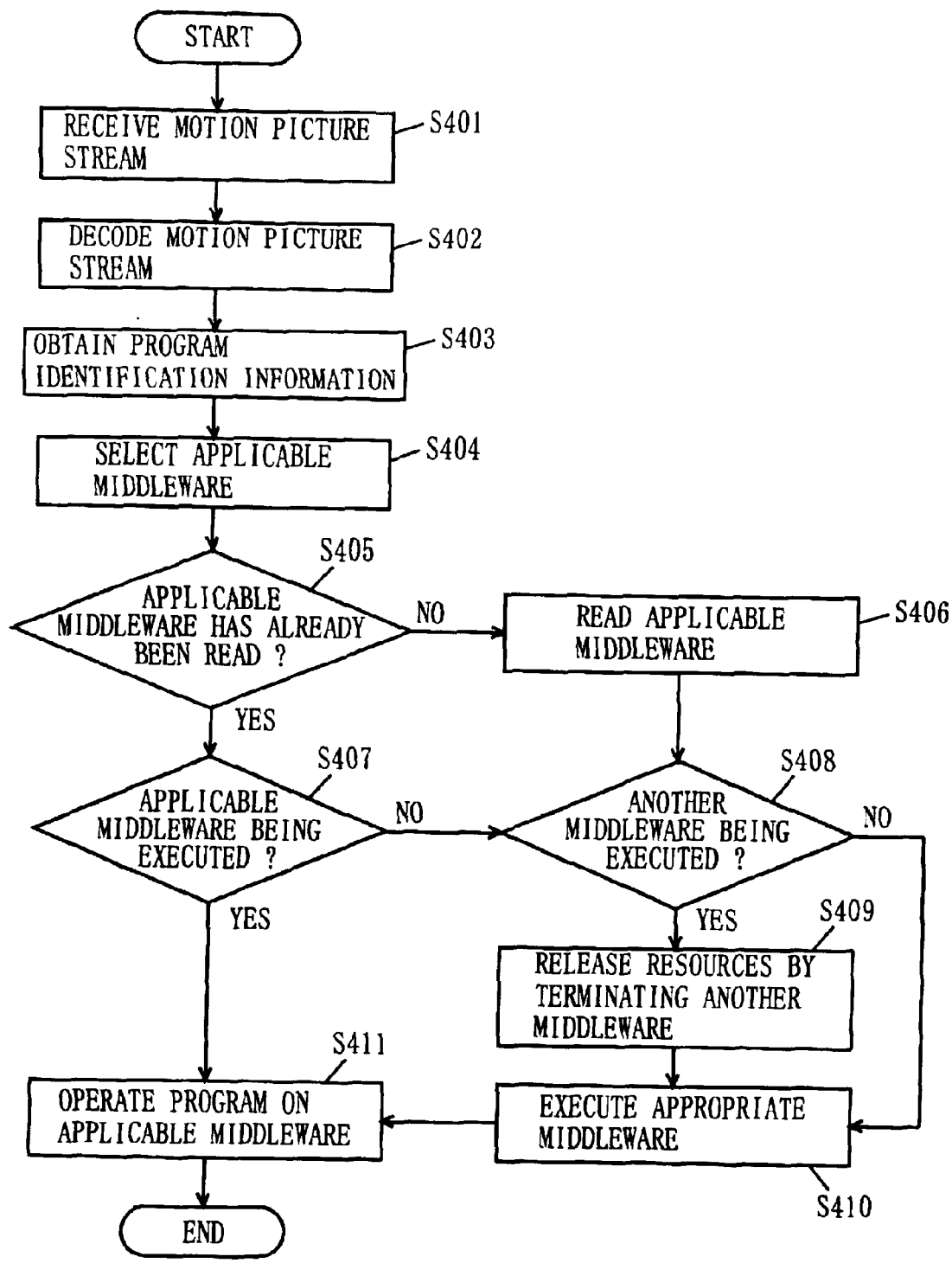
FIG. 7 is a flowchart showing the operation of the motion picture reproducing apparatus 13 according to the first embodiment of the present invention.

FIG. 7 is a flowchart illustrating the operation of the motion picture reproducing apparatus 13 according to the first embodiment of the present invention. In FIG. 7, when the receiving section 30 receives the motion picture stream 101 (step S401), the decoding section 31 decodes the motion picture stream 101 (step S402). Then, the decoded motion picture stream 101 is inputted to the middleware selecting and executing section 35 in the processing section 32, and the middleware selecting and executing section 35 carries out the processing as follows.

First, the applicable middleware selecting unit 40 extracts the program identification information 102 from the decoded motion picture stream 101 (step S403), and selects the middleware applicable to the program 103 contained in the motion picture stream 101 (hereinafter referred to as applicable middleware) (step S404).

Next, the middleware reading unit 41 determines whether the applicable middleware selected in step S404 has already been read (step S405). As a result of determination, if it has been read, the middleware reading unit 41 reports to the middleware executing unit 42 as such. If not yet been read, on the other hand, the middleware reading unit 41 refers to the correspondence list 201 to read the applicable middleware selected in step S404 from the middleware storage unit 43 (step S406). When reading of the applicable middleware is completed, step S408 is carried out.

When reported by the middleware reading unit 41 that the applicable middleware has been read, the middleware executing unit 42 determines whether the applicable middleware is currently being executed (step S407). Then, if the decision result is Yes, that is, if the applicable middleware is being executed, step S411 is carried out. If the decision result is No, that is, if the applicable middleware is not being executed, step S408 is carried out.

The above step S406 or S407 is followed by step S408, in which it is determined whether another middleware is currently being executed. Then, if another middleware is being executed, the middleware executing unit 42 terminates the middleware, and releases the resources that have been used by the middleware (step S409).

Next, the middleware executing unit 42 starts executing the applicable middleware read in step S406 (step S410). Then, step S411 is carried out. Described above is the processing of the middleware selecting and executing section 35.

The above step S407 or S410 is followed by step S411, in which the program 103 operates on the applicable middleware being executed, and then the operation results are displayed on the display section 33. Specifically, with the operation of the program 103, motion pictures are reproduced from the motion picture data 105, and the reproduced motion pictures are displayed on the display section 33. Also, with the operation of the program 103, the program data 104 is processed, and the processing results, that is, characters, still pictures, and others, are displayed on the display section 33. Described above is the operation of the present motion picture reproducing apparatus 13.

In the above, the motion picture stream 101 contains the motion picture data 105 and the program data 104, and therefore motion pictures, characters, still pictures, and others are displayed on the display section 33. It is possible, however, to display other various images. For example, if the motion picture stream 101 contains game data and graphic data, game screens and graphic screens are displayed on the display section 33.

Note that whether the applicable middleware has already been read can be determined in step S405 in the following manner. That is, if the middleware reading unit 41 has ever read the middleware and the memory area storing the read middleware has not been released, it is determined that it has already been read. On the other hand, if the middleware has never been read before, or has been read but the area storing the middleware has been released, it is determined that it has not been read.

Also, as to determination of whether the middleware is being executed in steps S407 and S408, if the middleware executing unit 42 has ever executed the middleware and has never terminated it, it is determined that it is being executed.

Furthermore, although the present motion picture reproducing apparatus 13 includes the decoding section 31, it may not include the decoding section 31 when the incoming motion picture stream 101 is the one not required to be decoded.

Still further, the MPEG-2 transport stream is taken as a typical example of the motion picture stream 101. However, any motion picture stream based on another specification can be used for implementation as long as the motion picture stream 101 contains the program identification information 102. However, if the program identification information 102 does not contain information indicating on which middleware the program 103 operates (middleware code in the present embodiment), such information has to be newly added.

Still further, it is assumed herein that the motion picture stream 101 is transmitted in electric wave from the broadcast stations 11 and 12 to the motion picture reproducing apparatus 13. However, the stream is not necessarily in electric wave form for implementation. For example, the broadcast stations 11 and 12 and the motion picture reproducing apparatus 13 are connected to each other with an optical fiber for transmitting the stream in optical wave form.

Still further, as the types of middleware, the JavaVM, the BML browser, and others have been mentioned. However, any middleware can be used for implementation as long as the middleware is of type executable on the motion picture reproducing apparatus 13.

Still further, the program 103 is a program created with a Java language or BML. However, any program can be used for implementation as long as the middleware that corresponds to the program 103 is of type executable on the motion picture reproducing apparatus 13.

Still further, the program data 104 may not be required for implementation if not required by the program 103.

Still further, the middleware reading unit 41 holds the correspondence list 201 and, by referring thereto, reads the middleware. However, the correspondence list 201 may not be required for implementation as long as information indicating the storage location of the middleware selected by the applicable middleware selecting unit 40 is held.

Still further, the middleware storage unit 43 is incorporated in the motion picture reproducing apparatus 13 (refer to FIG. 4), but may be located outside of the motion picture reproducing apparatus 13 and be connected to the motion picture reproducing apparatus 13 for implementation. At this time, the form of connection is not limited to the one directly to the motion picture reproducing apparatus 13, but may be the one via the network 14 for implementation.

Still further, if another middleware is being executed in steps S408 and S409, the middleware executing unit 42 terminates the middleware, and releases the resources that have been used by the middleware. If the motion picture reproducing apparatus 13 has sufficient resources, however, the processes in steps S408 and S409 can be omitted for implementation.

Still further, the middleware reading unit 41 reads the middleware selected by the appropriate middleware selecting unit 40 from the middleware storage unit 43. However, if reading operation is not required, for example, if the middleware storage unit 43 is implemented with the ROM 21, the reading process may not be carried out, and simply reporting the storage location of the middleware to the middleware executing unit 42 may be enough for implementation.

In the first embodiment, the motion picture reproducing apparatus that holds a plurality of pieces of middleware and have the middleware selecting and executing function for selecting and executing the middleware applicable to the program 103 contained in the motion picture stream 101 has been described. In second though sixth embodiments, a motion picture reproducing apparatus having a new function added to this middleware selecting and executing function is described.

Second Embodiment

A second embodiment is different from the first embodiment only in that the broadcast stations 11 and 12 may send a stream containing a correspondence-list revising program and that the motion picture reproducing apparatus 13 has a function of revising the correspondence list with the operation of the program.

The motion picture reproducing apparatus 13 according to the second embodiment of the present invention is similar in the entire construction to that according to the first embodiment. Also in the present embodiment, the block diagram of FIG. 4 is used as a diagram illustrating the entire construction of the motion picture reproducing apparatus 13.

Figure 8:
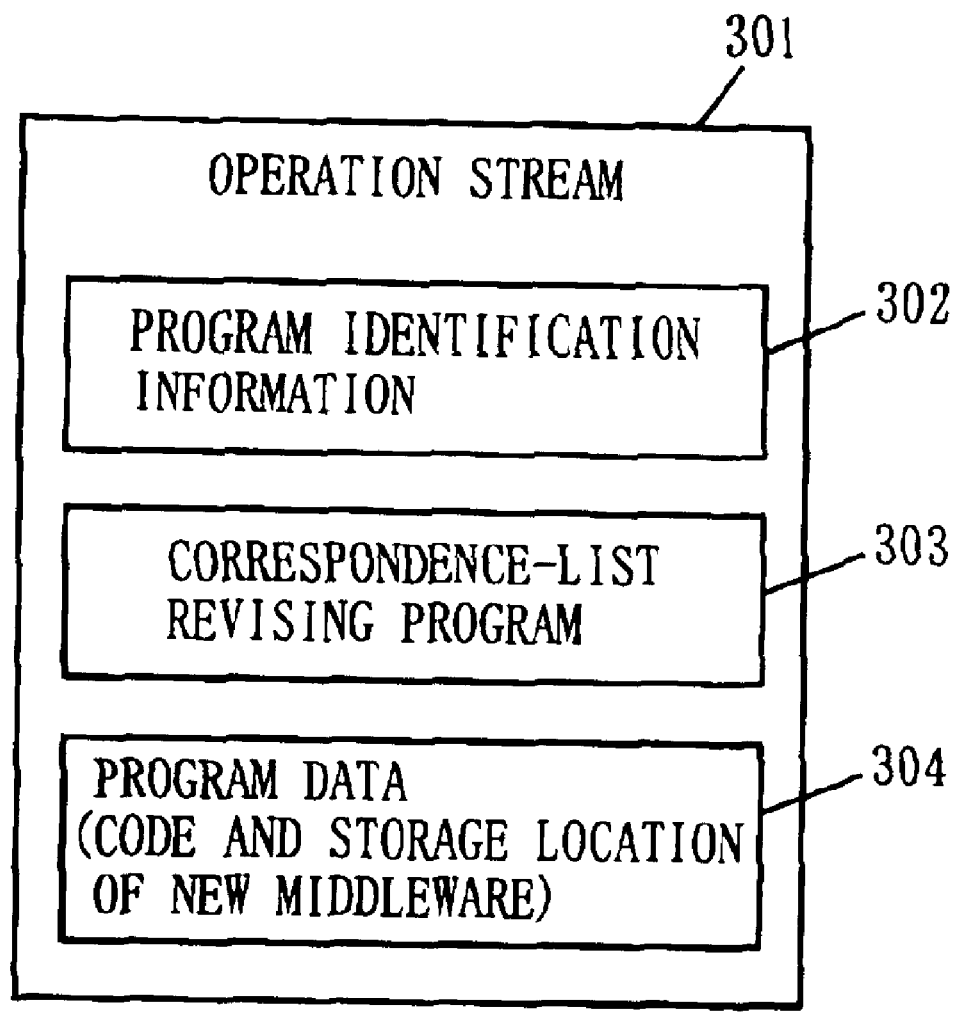
FIG. 8 is an illustration showing the contents of an operation stream sent from the broadcast stations 11 and 12 when a storage location of middleware is changed.
Figure 9:
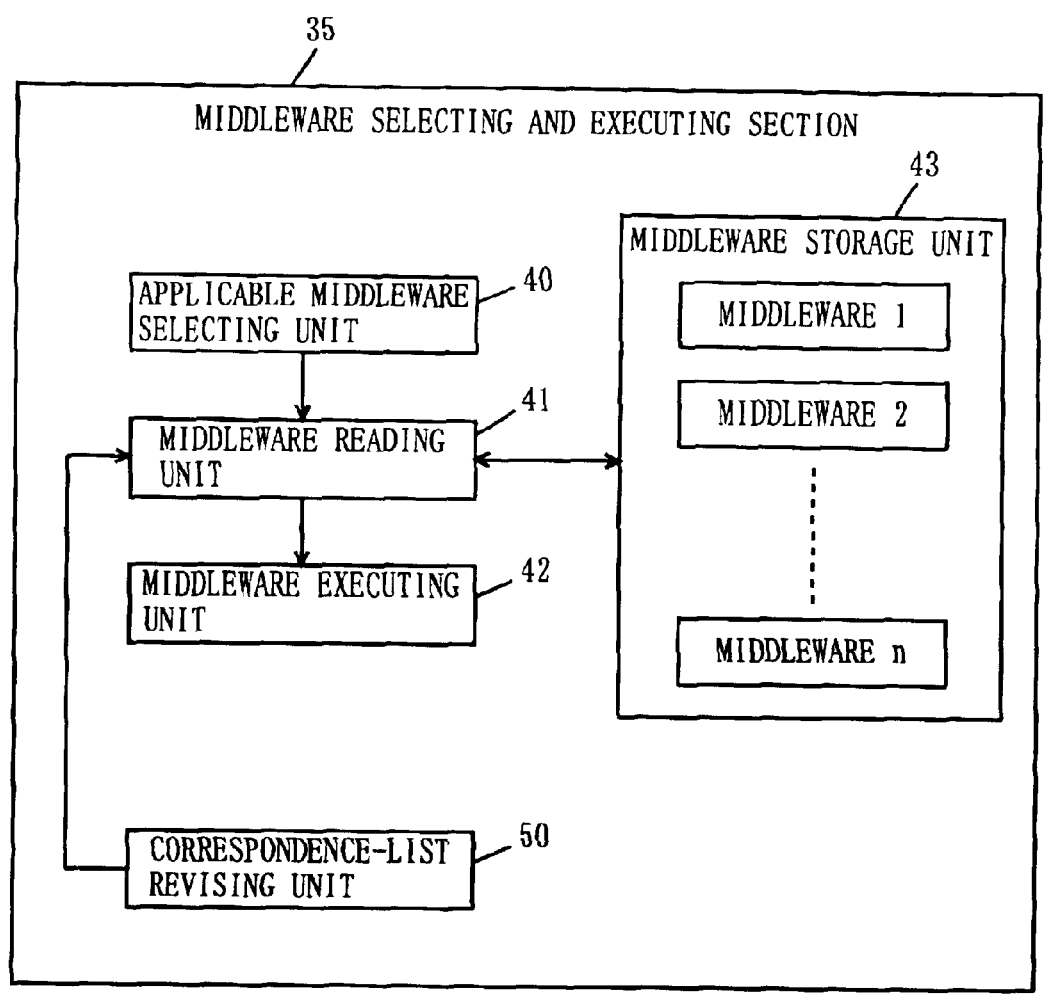
FIG. 9 is a block diagram illustrating an example construction of the middleware selecting and executing section 35 of FIG. 4 (second embodiment).

FIG. 8 is an illustration showing the contents of a stream sent from the broadcast stations 11 and 12 when the storage location of the middleware is changed or when new middleware is added (this is called "operation stream", as distinguished from the motion picture stream), and FIG. 9 is a block diagram illustrating the construction of the middleware selecting and executing section 35 of FIG. 4.

In FIG. 8, an operation stream 301 contains program identification information 302, a correspondence-list revising program 303, and program data 304. Note that, when the operation stream 301 is an MPEG-2 transport stream, dummy motion picture data is added thereto. The program data 304 is information indicating code and a storage location of new middleware.

The program identification information 302 contains, in addition to information indicating on which middleware the correspondence-list revising program 303 operates on (for example, middleware code), information indicating that the program 303 is for revising the correspondence list (for example, an identifier such as "0×10"). The correspondence-list revising program 303 is a program for revising the correspondence list held by the middleware reading unit in accordance with transfer or addition of middleware.

In FIG. 9, the middleware selecting and executing section 35 includes the applicable middleware selecting unit 40, the middleware reading unit 41, the middleware executing unit 42, the middleware storage unit 43, and a correspondence-list revising unit 50. The middleware storage unit 43 stores a plurality of pieces of middleware (middleware 1, middleware 2, . . . , middleware n).

Of the components illustrated in FIG. 9, those provided with the same reference numerals in FIG. 5 are the same as those in the first embodiment. That is, the middleware selecting and executing section 35 of FIG. 9 is the one constructed by adding the correspondence-list revising unit 50 for revising the correspondence list (refer to FIG. 6) held in the middleware reading unit 41 to the middleware selecting and executing section 35 of FIG. 5. This correspondence-list revising unit 50 is implemented by a correspondence-list revising program 303 operating on the middleware being executed while using the program data 304.

Hereinafter described is the operation of the above-constructed motion picture reproducing apparatus 13.

The operation of the present motion picture reproducing apparatus 13 from receiving the operation stream 301 as illustrated in FIG. 8 to executing the middleware applicable to the correspondence-list revising program 303 is similar to that in the first embodiment (refer to FIG. 7), and is not described herein. Thereafter, on the middleware being executed, the correspondence-list revising program 303 is activated. Then, with the correspondence-list revising program 303 operating while using the program data 304, the correspondence-list revising unit 50 is implemented in the middleware selecting and executing section 35, as illustrated in FIG. 9.

Then, the correspondence-list revising unit 50 revises the correspondence list held by the middleware reading unit so as to reflect transfer or addition of middleware. For example, when middleware in the external server 15 is transferred to another external server, the code of the middleware and a URL of the external server of destination are sent in pair. With reference to those, the correspondence-list revising unit 50 can make a revision. Furthermore, when new middleware is added to the external server 15, the code of the middleware and a URL of the external server 15 are sent in pair. With reference to those, it is possible to make a revision.

Alternatively, new middleware may be provided as being stored in a recording medium such as CD-ROM, and may be read by the motion picture reproducing apparatus 13 from the recording medium. In such case, the code of the middleware and information for identifying the recording medium are sent in pair. With reference to those, the correspondence-list revising unit 50 can makes a revision.

Note that, as an example of the information indicating that the program 303 is to revise the correspondence list, the identifier "0×10" has been mentioned. The information is not limited to such type of numerical values, but other information can be used for implementation as long as being capable of identifying that the program 303 is to revise the correspondence list. Also, when the operation stream 301 of FIG. 8 is an MPEG-2 transport stream, dummy motion picture data is further contained. However, such data may not be dummy for implementation. Furthermore, when the middleware is stored in the external server 15, the URL of the external server 15 is taken as one example of the information indicating the storage location of the middleware. However, other information may be used for implementation as long as being in data format usable by the middleware reading unit.

Third Embodiment

A third embodiment is different from the first embodiment only in that the broadcast stations 11 and 12 may send a stream containing a middleware adding program and a correspondence-list revising program and that, with the operation of those programs, the motion picture reproducing apparatus 13 has a function of adding new middleware and revising the correspondence list in accordance with addition of the middleware.

The motion picture reproducing apparatus 13 according to the third embodiment of the present invention is similar in the entire construction to that according to the first embodiment. Also in the present embodiment, the block diagram of FIG. 4 is used as a diagram illustrating the entire construction of the motion picture reproducing apparatus 13.

Figure 10:
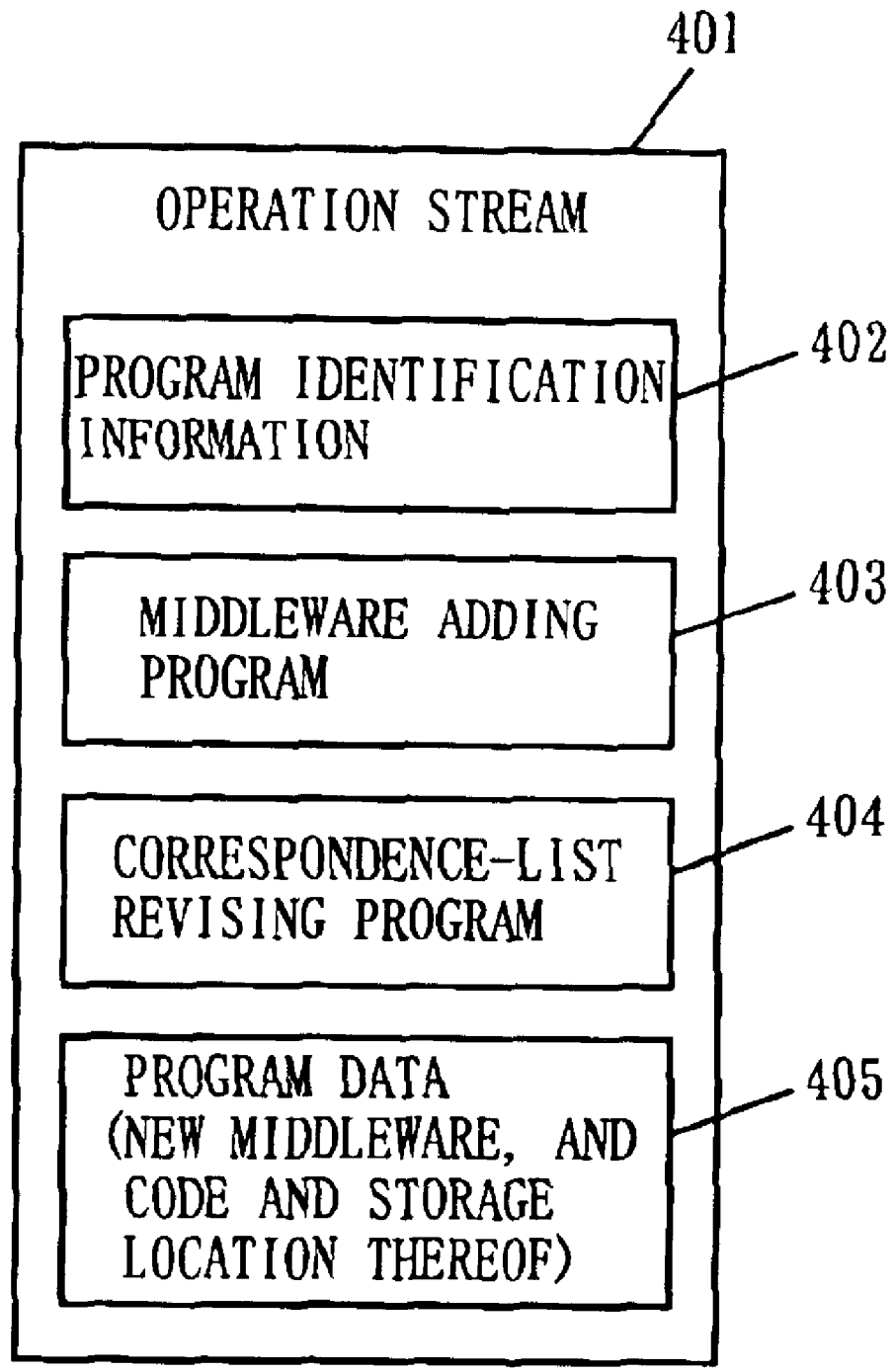
FIG. 10 is an illustration showing the contents of an operation stream sent from the broadcast stations 11 and 12 when it is desired to provide the motion picture apparatus 13 with middleware in a third embodiment.
Figure 11:
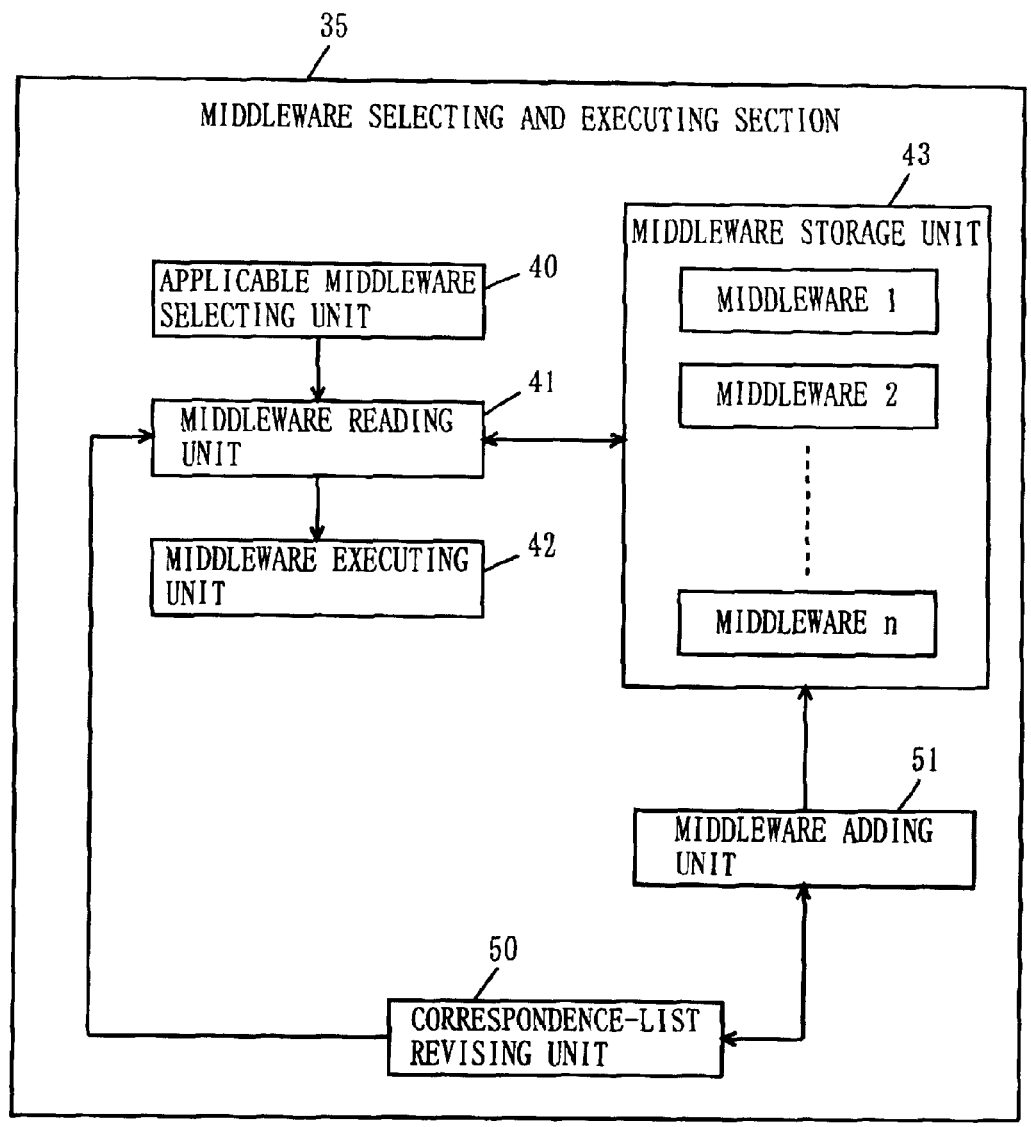
FIG. 11 is a block diagram showing the construction of the middleware selecting and executing section 35 of FIG. 4 (third embodiment).

FIG. 10 is an illustration showing the contents of an operation stream sent from the broadcast stations 11 and 12 when new middleware is added to the motion picture reproducing apparatus 13, and FIG. 11 is a block diagram illustrating the construction of the middleware selecting and executing section 35 of FIG. 4.

In FIG. 10, an operation stream 401 contains program identification information 402, a middleware adding program 403, a correspondence-list revising program 404, and program data 405. Note that when the operation stream 401 is an MPEG-2 transport stream, dummy motion picture data is added thereto. The program data 405 contains middleware to be added, and information indicating code and a storage location of the middleware.

The program identification information 402 contains, in addition to information indicating on which middleware the two programs 403 and 404 contained in the operation stream 401 operate, and information indicating that these two programs are to change the middleware and to revise the correspondence list (for example, identifiers such as "0×10" and "0×20"). The middleware adding program 403 is a program for adding and storing new middleware to and in the middleware storage unit 43. The correspondence-list revising program 404 is a program for revising the correspondence list held by the middleware reading unit in accordance with addition of middleware.

In FIG. 11, the middleware selecting and executing section 35 includes the applicable middleware selecting unit 40, the middleware reading unit 41, the middleware executing unit 42, the middleware storage unit 43, a middleware adding unit 51, and the correspondence-list revising unit 50. The middleware storage unit 43 stores a plurality of pieces of middleware (middleware 1, middleware 2, ..., middleware n).

Of the components illustrated in FIG. 11, those provided with the same reference numerals in FIG. 5 are the same as those in the first embodiment. That is, the middleware selecting and executing section 35 of FIG. 9 is the one constructed by further providing the middleware selecting and executing section 35 of FIG. 5 with the middleware adding unit 51 for adding new middleware to the middleware storage unit 43 and the correspondence-list revising unit 50 for revising, in accordance with addition of middleware, the correspondence list held in the middleware reading unit 41. These middleware adding unit 51 and the correspondence-list revising unit 50 are implemented by the middleware adding program 403 and the correspondence-list revising program 404 operating on the applicable middleware being executed while using the program data 405.

Hereinafter described is the operation of the above-constructed motion picture reproducing apparatus 13.

The operation of the present motion picture reproducing apparatus 13 from receiving the operation stream 401 as illustrated in FIG. 10 to executing the middleware applicable to the middleware changing program 403 and the correspondence-list revising program 404 is similar to that in the first embodiment (refer to FIG. 7), and is not described herein. Thereafter, on the middleware being executed, the middleware changing program 403 and the correspondence-list revising program 404 are activated. Then, with the middleware changing program 403 and the correspondence-list revising program 404 operating while using the program data 405, the middleware adding unit 51 and the correspondence-list revising unit 50 are implemented in the middleware selecting and executing section 35, as illustrated in FIG. 11.

The above-implemented middleware adding unit 51 carries out the process of adding new middleware in the middleware storage unit 43. The correspondence-list revising unit 50, on the other hand, carries out the process of revising the correspondence list held by the middleware reading unit for reflecting the addition of the middleware. That is, when new middleware is added, a middleware body, and code and a storage location thereof are sent as the program data 405. Therefore, the middleware adding unit 51 can add and store the middleware to and in the middleware storage unit 43. Also, the correspondence-list revising unit 50 can add the code and storage location of the new middleware to the correspondence list.

Note that, as one example of the information indicating that the two programs 403 and 404 are to add middleware and revise the correspondence list, the identifiers "0×20" and "0×10" have been mentioned. The information is not limited to such type of numerical values, but other information can be used for implementation as long as being capable of identifying that the programs are to adding middleware and revise the correspondence list.

Also, the middleware to be newly added is sent to the motion picture reproducing apparatus 13 as being contained in the operation stream 401. However, the middleware may be sent not as being contained in the operation stream 401, but may be sent to the motion picture reproducing apparatus 13 via the network 14 for implementation.

Furthermore, the process for adding new middleware has been described. However, it can be implemented to delete the existing middleware, or replace the existing middleware with new middleware. In a case of deleting the middleware, the operation stream 401 contains, instead of the middleware adding program 403, a middleware deleting program and the correspondence-list revising program. The middleware deleting program is a program for deleting the middleware from the middleware storage unit 43. The correspondence-list revising program is a program for revising the correspondence list in accordance with the deletion of middleware. Also, the program data 405 contains code and a storage location of the middleware to be deleted.

In a case of replacing the existing middleware with new middleware, the operation stream 401 contains, instead of the middleware adding program 403, a middleware replacing program and the correspondence-list revising program. The middleware replacing program is a program for replacing the middleware in the middleware storage unit 43 with new middleware. The correspondence-list revising program is a program for revising the correspondence list in accordance with the replacement of middleware. Also, the program data 405 contains code and a storage location of the existing middleware to be replaced, and code and a storage location of the new middleware.

Fourth Embodiment

A fourth embodiment is different from the first embodiment only in that a single broadcast station (hereinafter, the broadcast station 11) may send a motion picture stream containing a plurality of programs being functionally the same but operating on different pieces of middleware and that the motion picture reproducing apparatus 13 further has a function of operating a program corresponding to middleware having a highest priority of these plurality of programs. That is, each middleware is given a priority, and the motion picture reproducing apparatus 13 executes the middleware given a highest priority to operate a program applicable to the middleware.

For example, when the motion picture reproducing apparatus 13 holds a JavaVM and a BML browser as executable middleware, the priority is set as "priority on JavaVM". Then, when the broadcast station 11 sends a motion picture stream containing a motion picture reproducing program operable on the JavaVM and a motion picture reproducing program operated on the BML browser, the motion picture reproducing apparatus 13 executes the JavaVM according to "priority on JavaVM". Then, on the JavaVM being executed, the motion picture reproducing program of type applicable to the JavaVM operates.

The motion picture reproducing apparatus 13 according to the fourth embodiment of the present invention is similar in the entire construction to that according to the first embodiment. Also in the present embodiment, the block diagram of FIG. 4 is used as a diagram illustrating the entire construction of the motion picture reproducing apparatus 13.

Figure 12:
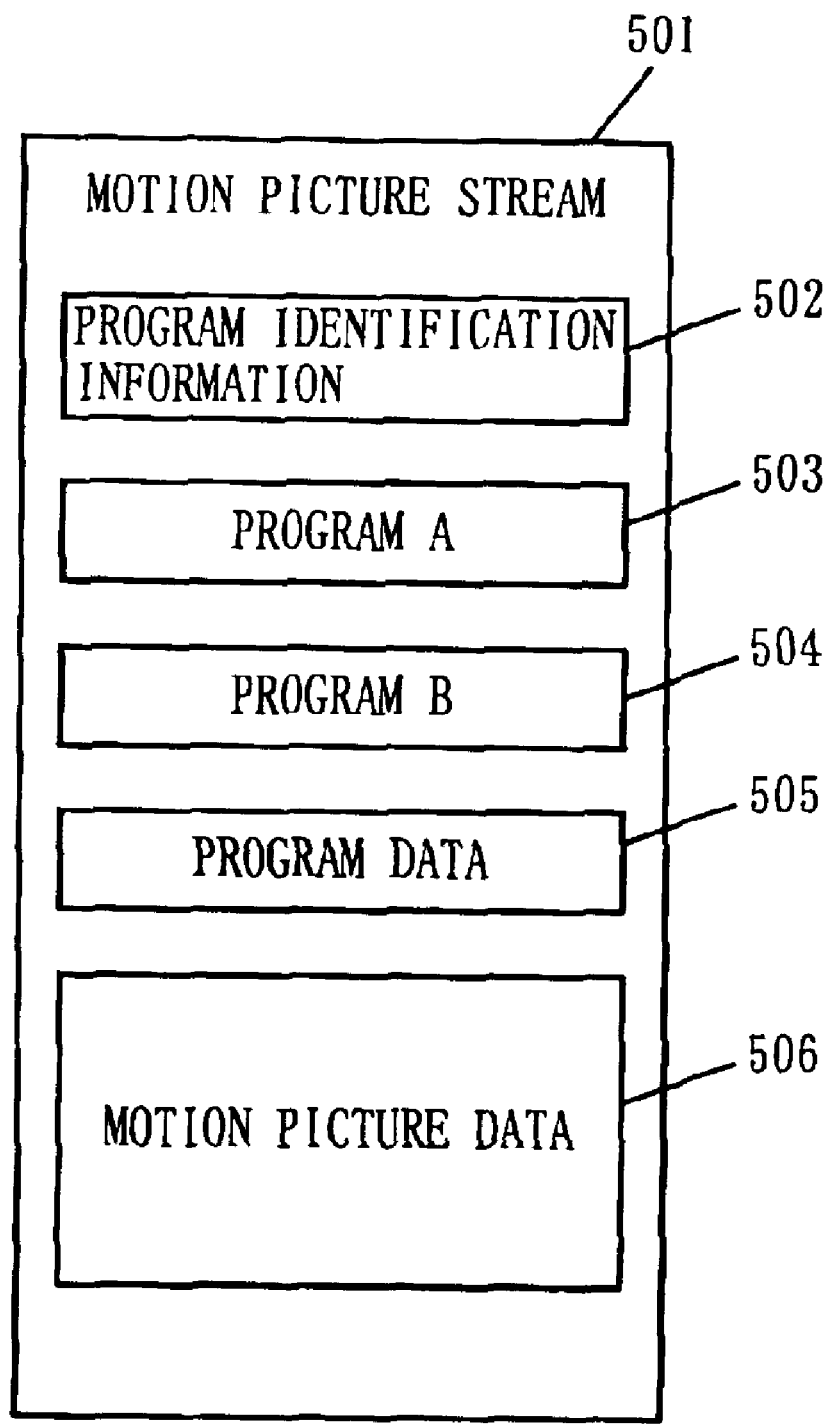
FIG. 12 is an illustration showing the contents of a motion picture stream sent from the broadcast station 11 of FIG. 1 in a fourth embodiment.
Figure 13:
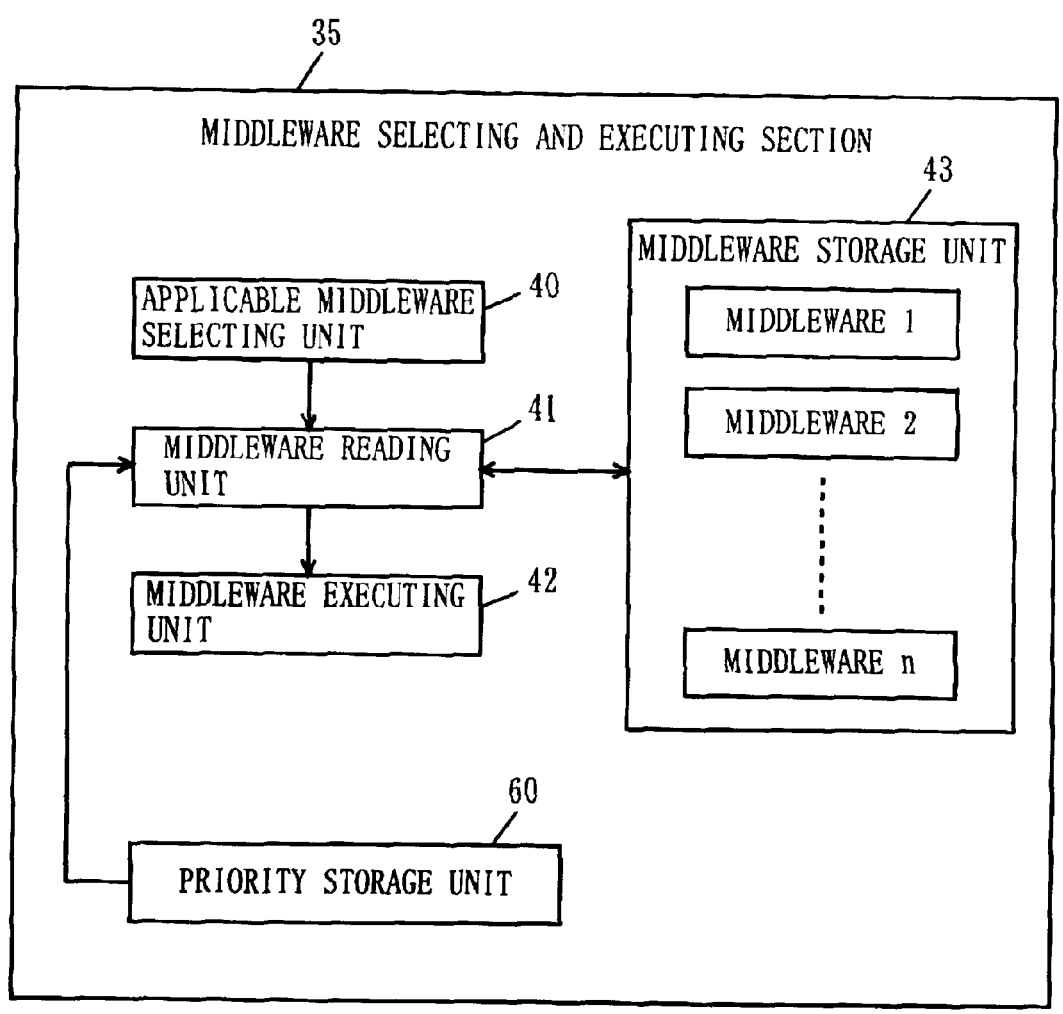
FIG. 13 is a block diagram illustrating the construction of the middleware selecting and executing section 35 of FIG. 4 (fourth embodiment).

FIG. 12 is an illustration showing the contents of a motion picture stream sent from the broadcast station 11, and FIG. 13 is a block diagram illustrating the construction of the middleware selecting and executing section 35 of FIG. 4.

In FIG. 12, a motion picture stream 501 contains program identification information 502, a program A503, a program B504, program data 505, and motion picture data 506. In this case, the program A503 and the program B504 are both programs for processing the motion picture data 506 to reproduce motion pictures. However, they are different from each other in applicable middleware. For example, the program A503 operates on the JavaVM, while the program A504 operates on the BML browser.

The program identification information 502 contains information indicating on which middleware the program A503 and the program B504 respectively operate. The program data 505 contains data for displaying, for example, characters, still pictures, and others.

In FIG. 13, the middleware selecting and executing section 35 includes the applicable middleware selecting unit 40, the middleware reading unit 41, the middleware executing unit 42, the middleware storage unit 43, and a priority storage unit 60. The middleware storage unit 43 stores a plurality of pieces of middleware (middleware 1, middleware 2, . . . , middleware n). The priority storage unit 60 stores information indicating priorities set to the respective middleware in the middleware storage unit 43.

Of the components illustrated in FIG. 13, those provided with the same reference numerals in FIG. 5 are the same as those in the first embodiment. That is, the middleware selecting and executing section 35 of FIG. 13 is the one constructed by further providing the middleware selecting and executing section 35 of FIG. 5 with the priority storage unit 60 that stores priority information as to the middleware in the middleware storage unit 43.

Hereinafter described is the operation of the above-constructed motion picture reproducing apparatus 13.

In the present motion picture reproducing apparatus 13, in the flowchart of FIG. 7, only added between steps S404 and S405 is step S404a, which will be described later.

In step S404, the applicable middleware selecting unit 40 extracts the program identification information 502 from the decoded motion picture stream 501. This program identification information 502 contains information about on which middleware the program A503 and program B504 contained in the motion picture stream 501 received in step S401 by the receiving section 30 respectively operate. The middleware applicable to the program A503 and the middleware applicable to the program B504 are selected.

This step S404 is followed by S404a, in which the applicable middleware selecting unit 40 refers to the contents of the priority storage unit 60 to further select the middleware having a higher priority of the two pieces of middleware selected in step S404. Then, executed in step S406 is applicable middleware having the highest priority, which is narrowed down through the two-step selection in steps S405 and S405a.

Then, in step S411, the program applicable to the middleware operates on the middleware being executed.

Note that, although the priorities of the respective middleware in the priority storage unit 60 are predetermined fixed values, the priorities may be changed for implementation, by the user through the input section 34.

Also, the priority information of middleware is stored in the priority storage unit 60 and middleware selection is automatically made based on the priority information. However, it is possible for implementation that the user determines the priority of middleware and inputs the result.

Furthermore, the motion picture stream 501 contains two programs 503 and 504 having the same function but different from each other in applicable middleware. However, three or more programs may be stored for implementation.

Fifth Embodiment

A fifth embodiment is different from the fourth embodiment only in that the broadcast stations 11 and 12 may send a motion picture stream containing a priority changing program and that the motion picture reproducing apparatus 13 further has a function of changing priority of middleware with the operation of the program. The motion picture reproducing apparatus 13 according to the fifth embodiment of the present invention is similar in the entire construction to that according to the fourth (first) embodiment. Also in the present embodiment, the block diagram of FIG. 4 is used as a diagram illustrating the entire construction of the motion picture reproducing apparatus 13.

Figure 14:
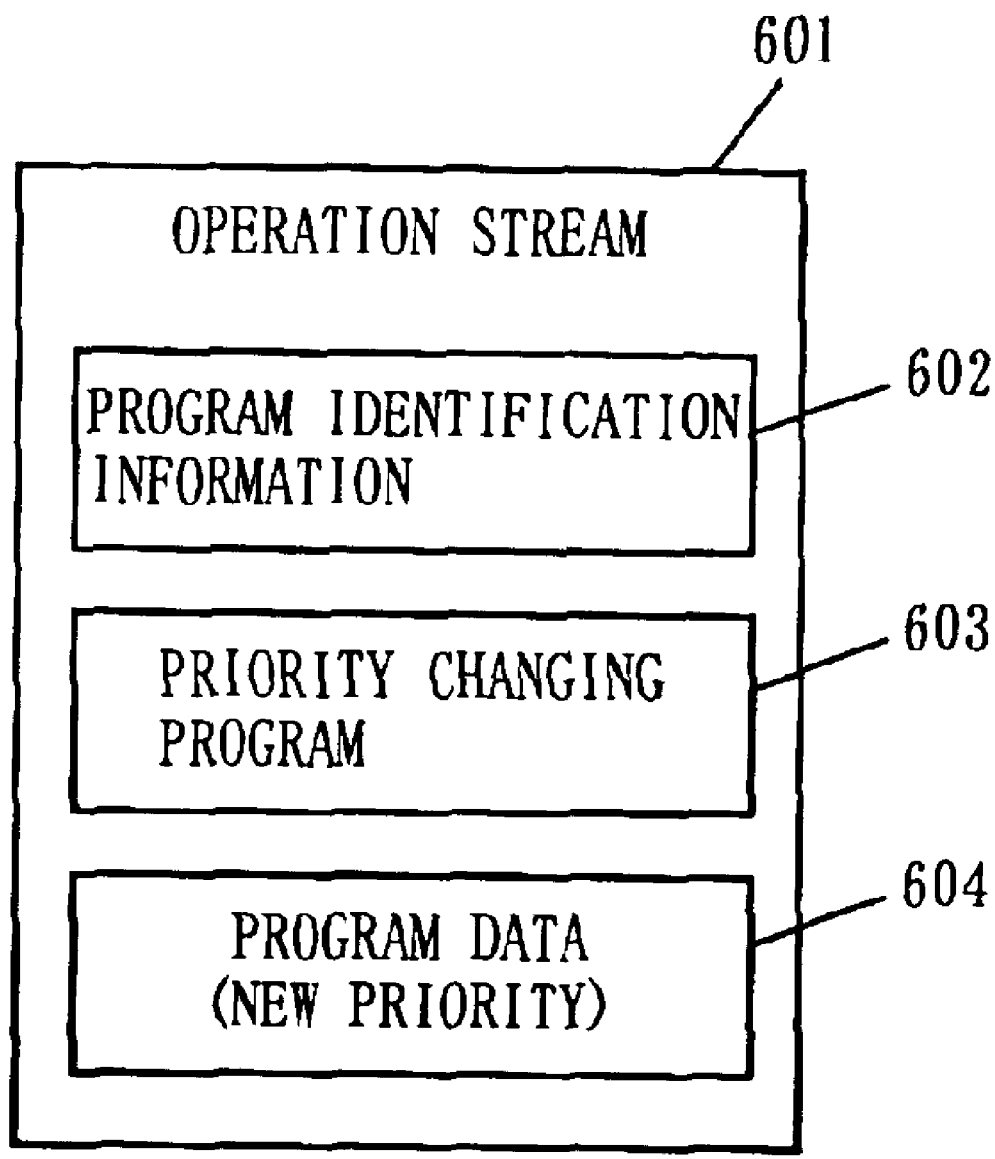
FIG. 14 is an illustration showing the contents of an operation stream sent from the broadcast stations 11 and 12 when it is desired to change priority of middleware in a fifth embodiment.
Figure 15:
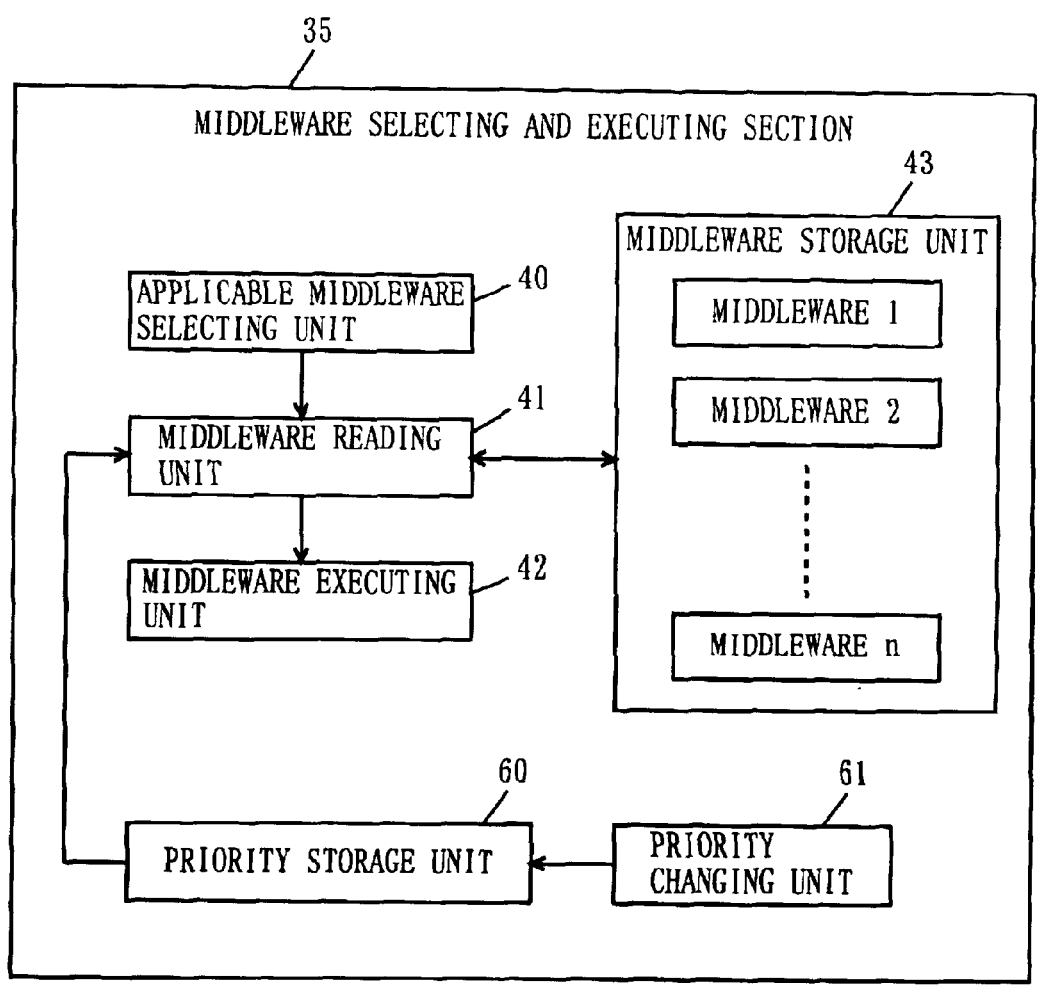
FIG. 15 is a block diagram illustrating the construction of the middleware selecting and executing section 35 of FIG. 4 (fifth embodiment).

FIG. 14 is an illustration showing the contents of an operation stream sent from the broadcast stations 11 and 12 when it is desired to change the priority of middleware, and FIG. 15 is a block diagram illustrating the construction of the middleware selecting and executing section 35 of FIG. 4.

In FIG. 14, an operation stream 601 contains program identification information 602, a priority changing program 603, and program data 604. Note that, when the operation stream 601 is an MPEG-2 transport stream, dummy motion picture data is further added thereto. The program data 604 contains new priority information.

The program identification information 602 contains, in addition of the information indicating on which middleware the priority changing program 603 operates (for example, middleware code), information indicating that the program 603 is to change the priority (for example, an identifier such as "0x30"). The priority changing program 603 is a program for changing the existing priority information stored in the priority storage unit 60 into new priority information.

In FIG. 15, the middleware selecting and executing section 35 includes the applicable middleware selecting unit 40, the middleware reading unit 41, the middleware executing unit 42, the middleware storage unit 43, the priority storage unit 60, and a priority changing unit 61. The middleware storage unit 43 stores a plurality of pieces of middleware (middleware 1, middleware 2, . . . , middleware n).

Of the components illustrated in FIG. 15, those provided with the same reference numerals in FIG. 12 (5) are the same as those in the fourth (first) embodiment. That is, the middleware selecting and executing section 35 of FIG. 15 is the one constructed by further providing the middleware selecting and executing section 35 of FIG. 12 with the priority changing unit 61 that changes the priority information stored in the priority storage unit 60. This priority changing unit 61 is implemented by the priority changing program 603 operating on the middleware being executed while using the program data 604.

Hereinafter described is the operation of the above-constructed motion picture reproducing apparatus 13.

The operation of the present motion picture reproducing apparatus 13 from receiving the operation stream 601 as illustrated in FIG. 14 to executing the middleware applicable to the priority changing program 603 is similar to that in the fourth (first) embodiment (refer to FIG. 7), and is not described herein. Thereafter, on the middleware being executed, the priority changing program 603 is activated. Then, with the priority changing program 603 operating while using the program data 604, the priority changing unit 61 is implemented in the middleware selecting and executing section 35, as illustrated in FIG. 15. Then, the priority changing unit 61 changes the priority information stored in the priority storage unit 60 into new priority sent from the broadcast stations 11 and 12.

For example, in a case where the priority is set as "priority on JavaVM" in the motion picture reproducing apparatus 13, when the operation stream 60 containing the priority changing program 603 and new priority information "priority on BML browser" is coming from the broadcast stations 11 and 12, the motion picture reproducing apparatus 13 first executes the JavaVM according to "priority on JavaVM". Then, on the JavaVM being executed, the priority changing program 603 operates. As a result, in the motion picture reproducing apparatus 13, the priority is changed from "priority on JavaVM" to "priority on BML browser". Thereafter, in the motion picture reproducing apparatus 13, when the received motion picture stream contains two type of programs, the one applicable to the JavaVM and the other applicable to the BML browser, the BML browser is activated with a higher priority, and the program of type applicable to the BML browser operates on the BML browser.

Note that, as one example of the information indicating that the program 603 is to change the priority, the identifier "0×10" has been mentioned. The information is not limited to such type of numerical values, but other information can be used for implementation as long as being capable of identifying that the program 603 is to change the priority. Also, when the operation stream 601 of FIG. 14 is an MPEG-2 transport stream, dummy motion picture data is further contained. However, the data may not necessarily be dummy for implementation.

Sixth Embodiment

A sixth embodiment is different from the first embodiment in the following (a) and (b): (a) A single broadcast station (hereinafter, the broadcast station 11) may provide a plurality of services different from each other (for example, first and second services), and a motion picture stream containing a plurality of programs corresponding to these plurality of services may be sent from the broadcast station 11. The motion picture reproducing apparatus 13 selects a service to be received (either one of a first broadcast service and a second broadcast service), and executes the program corresponding to the broadcast.

Even for the motion picture stream sent out from the single broadcast station 11, the plurality of programs contained therein do not necessarily operate on the same middleware. Therefore, once selecting a broadcast service desired to be received, the motion picture reproducing apparatus 13 selects middleware for operating the program corresponding to that broadcast service for execution. Then, with the program operating on the middleware being executed, the motion picture reproducing apparatus 13 can receive the selected broadcast service.

For example, assume that a program for the first broadcast and a program for the second broadcast are contained in a motion picture stream, the former program of type applicable to a JavaVM and the latter of type applicable to a BML browser. At this time, when the first broadcast is selected, the JavaVM is executed, and the program for the first broadcast operates on the JavaVM being executed.

(b) The operating program may give an instruction for switching the broadcast service as mentioned above. For example, the program for the first broadcast that is operating on the JavaVM gives an instruction for switching from the first broadcast to the second broadcast. In this case, in the motion picture reproducing apparatus 13, the BML browser is activated and, on the BML browser, the program for the second broadcast starts operating. On the other hand, the JavaVM is terminated, and the resources used by the JavaVM are released.

The motion picture reproducing apparatus 13 according to the sixth embodiment of the present invention is similar in the entire construction to that according to the first embodiment. Also in the present embodiment, the block diagram of FIG. 4 is used as a diagram illustrating the entire construction of the motion picture reproducing apparatus 13.

Figure 16:
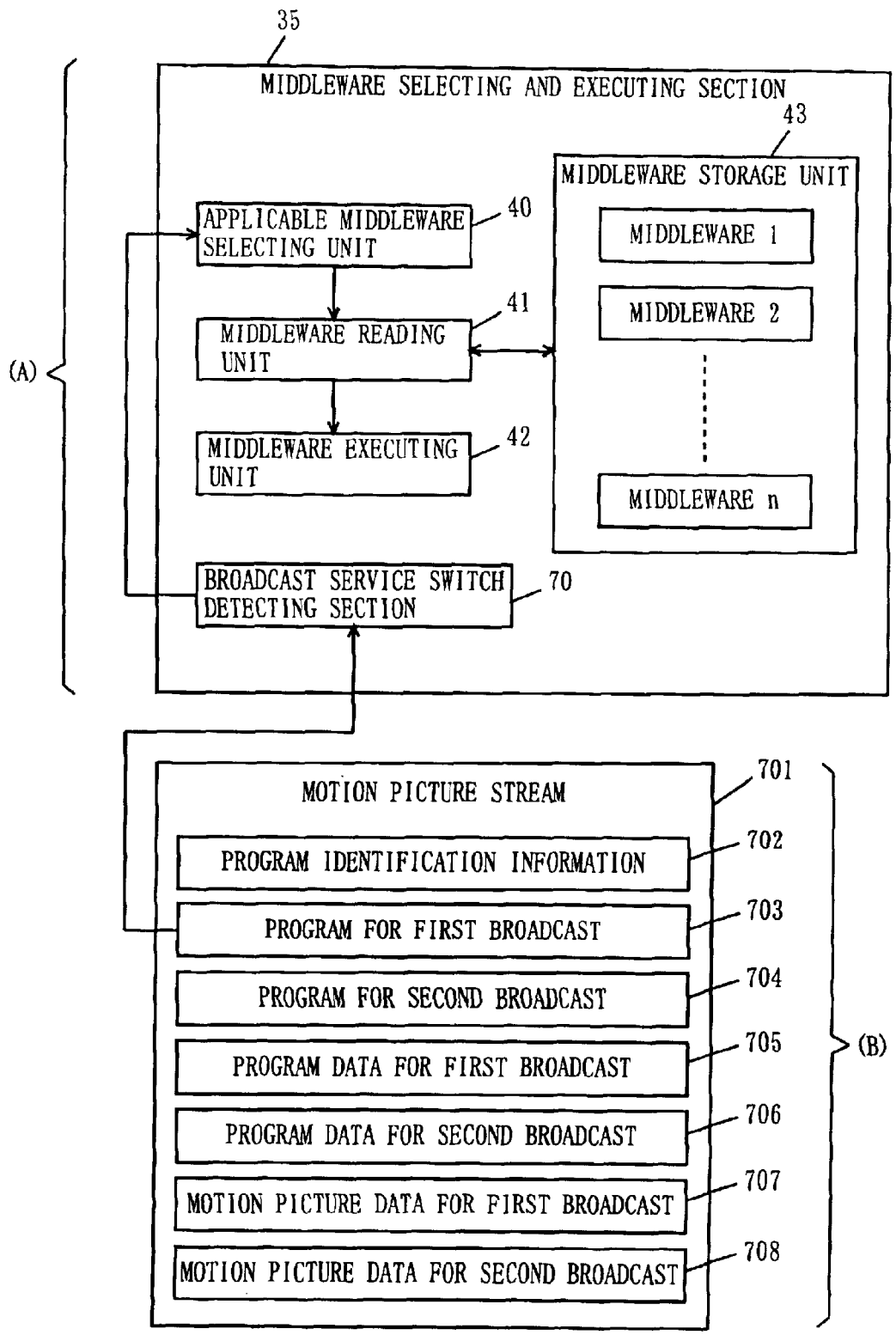
FIG. 16 shows (A) a block diagram illustrating the construction of the middleware selecting and executing section 35 of FIG. 4 (sixth embodiment), and (B) an illustration showing the contents of a motion picture stream sent from the broadcast station 11.

FIG. 16 (A) is a block diagram illustrating the construction of the middleware selecting and executing section 35 of FIG. 4, and FIG. 16 (B) is an illustration showing the contents of a motion picture stream sent from the broadcast station 11.

In FIG. 16 (B), a motion picture stream 701 contains program identification information 702, a program for the first broadcast 703, a program for the second broadcast 704, program data for the first broadcast 705, program data for the second broadcast 706, motion picture data for the first broadcast 707, and motion picture data for the second broadcast 708.

The program for the first broadcast 703 is a program for processing the motion picture data for the first broadcast 707 to reproduce motion pictures for the first broadcast. The program for the second broadcast 704 is a program for processing the motion picture data for the second broadcast 708 to reproduce motion pictures for the second broadcast. The program for the first broadcast 703 and the program for the second broadcast 704 are different from each other in applicable middleware. For example, the program for the first broadcast 703 operates on the JavaVM, while the program for the second broadcast 704 operates on the BML browser.

Also, the program for the first broadcast 703 uses the program data for the first broadcast 705 to make characters and still pictures displayed. Similarly, the program for the second broadcast 704 uses the program data for the second broadcast 706 to make characters, still pictures, and others displayed.

Furthermore, the program for the first broadcast 703 also has a function of switching the first broadcast to the second broadcast to give an instruction for starting reproduction of motion pictures of the second broadcast.

The program identification information 702 contains information indicating to which broadcast service the respective programs 703 and 704 correspond, and information indicating on which middleware they operate. Each of the program data 705 and 706 contains data for displaying characters, still pictures, and others, for example.

In FIG. 16 (A), the middleware selecting and executing section 35 includes the applicable middleware selecting unit 40, the middleware reading unit 41, the middleware executing unit 42, the middleware storage unit 43, and a broadcast service switch detecting unit 70. The middleware storage unit 43 stores a plurality of pieces of middleware (middleware 1, middleware 2, . . . , middleware n).

Of the components illustrated in FIG. 16 (A), those provided with the same reference numerals in FIG. 5 are the same as those in the first embodiment. That is, the middleware selecting and executing section 35 of FIG. 16 (A) is the one constructed by further providing the middleware selecting and executing section 35 of FIG. 5 with the broadcast service switch detecting unit 70. The broadcast service switch detecting unit 70 detects that the program for the first broadcast 703 that is operating on the applicable middleware instructs the motion picture reproducing apparatus 13 to switch the first broadcast service to the second broadcast service, and requests the applicable middleware selecting unit 40 to select the middleware applicable to the program for the second broadcast 704.

Hereinafter described is the operation of the above-constructed motion picture reproducing apparatus 13.

The operation of the present motion picture reproducing apparatus 13 from receiving the motion picture stream 701 as illustrated in FIG. 16 (B) to executing the middleware applicable to the program for the first broadcast 703 is similar to that in the first embodiment (refer to FIG. 7), and is not described herein. Thereafter, on the middleware being executed, the program for the first broadcast 703 gives an instruction for switching the service to be received from the first broadcast to the second broadcast. The broadcast service switch detecting unit detects this instruction, and requests the applicable middleware selecting unit 40 to select middleware applicable to the program for the second broadcast 704.

In response, the applicable middleware selecting unit 40 selects the middleware applicable to the program for the second broadcast 704 based on the program identification information, and reports the result to the middleware reading unit 41. The middleware reading unit 41 reads the reported middleware from the middleware storage unit 43, and the middleware executing unit 42 starts executing it. Thereafter, the program for the second broadcast 704 operates on the middleware being executed, and the motion picture reproducing apparatus starts reproducing motion pictures, characters, still pictures, and others for the second broadcast.

INDUSTRIAL APPLICABILITY

As described above, according to the embodiments of the present invention, achieved is a motion picture reproducing apparatus at low price (being little increased in price even though the number of specifications are increased) capable of receiving motion picture streams complying with various specifications such as those containing programs that operate on different pieces of middleware, and reproducing motion pictures.

What is claimed is

1. A middleware selecting and executing device for motion picture reproduction used in a motion picture reproducing apparatus that reproduces motion pictures by receiving a motion picture stream containing motion picture data, a program, and program identification information sent out from a broadcast station, and operating the program on middleware based on the program identification information to process the motion picture data, the device selectively executing middleware applicable to the program to make the program operable, the device comprising:

middleware storage means that stores a plurality of pieces of middleware that are different from each other;

selecting means for selecting, based on the program identification information in the motion picture stream received by the motion picture reproducing apparatus, the middleware applicable to the program in the motion picture stream;

reading means for reading the middleware selected by the selecting means from the middleware storage means; and executing means for executing the middleware read by the reading means.

2. The middleware selecting and executing device for motion picture reproduction according to claim 1, wherein when the middleware selected by the selecting means is not stored in the middleware storage means, the reading means reads the middleware from an external server via a network.

3. The middleware selecting and executing device for motion picture reproduction according to claim 2, wherein the reading means additionally stores the middleware read from the external server via the network in the middleware storage means; and when the middleware is again selected by the selecting means, reads the middleware from the middleware storage means.

4. The middleware selecting and executing device for motion picture reproduction according to claim 1, further comprising adding means for additionally storing new middleware provided by the broadcast station in the middleware storage means.

5. The middleware selecting and executing device for motion picture reproduction according to claim 4, wherein the broadcast station further sends out an operation stream containing middleware, a middleware adding program, and program identification information, and the adding means is implemented by the motion picture reproducing apparatus receiving the operation stream and operating, based on the program identification information, the middleware adding program on middleware applicable to the middleware adding program.

6. The middleware selecting and executing device for motion picture reproduction according to claim 1, wherein the program identification information in the motion picture stream contains middleware code indicating to which middleware the program in the motion picture stream is applicable, and the reading means holds a correspondence list containing, for each executable middleware, middleware code and a storage location thereof in relation to each other, and when reading the middleware selected by the selecting means, extracts the middleware code from the program identification information in the stream received by the motion picture reproducing apparatus for comparison with the correspondence list to specify the storage location of the middleware.

7. The middleware selecting and executing device for motion picture reproduction according to claim 6, further comprising correspondence-list revising means for making revision so as to additionally write middleware code and a storage location of new middleware in the correspondence list held by the reading means.

8. The middleware selecting and executing device for motion picture reproduction according to claim 7, wherein the broadcast station further sends out an operation stream containing the middleware code and the storage location of the new middleware, a correspondence-list revising program, and program identification information, and the correspondence-list revising means is implemented by the motion picture reproducing apparatus receiving the operation stream, and operating, based on the program identification information, the correspondence-list revising program on middleware applicable to the correspondence-list revising program.

9. The middleware selecting and executing device for motion picture reproduction according to claim 6, further comprising:

adding means for additionally storing new middleware provided by the broadcast station in the middleware storage means; and correspondence-list revising means for making, in accordance with the new middleware additionally stored in the middleware storage means, revision so as to additionally write middleware code and a storage location of the new middleware in the correspondence list held by the reading means.

10. The middleware selecting and executing device for motion picture reproduction according to claim 9, wherein the broadcast station further sends an operation stream containing the new middleware, a middleware adding program, the middleware code and the storage location of the new middleware, a correspondence-list revising program and program identification information, and the adding means and the correspondence-list revising means are implemented by the motion picture reproducing apparatus receiving the operation stream and operating, based on the program identification information, the middleware adding program and the correspondence-list revising program on middleware applicable to the middleware adding program and the correspondence-list revising program.

11. The middleware selecting and executing device for motion picture reproduction according to claim 1, further comprising priority storage means for storing information indicating a priority of each executable middleware, wherein when the motion picture stream contains a plurality of programs having the same function and operating on different pieces of middleware and any one of the plurality of programs is selected by the motion picture reproduction for operation, the reading means refers to the information in the priority storage means to read middleware having a highest priority.

12. The middleware selecting and executing device for motion picture reproduction according to claim 11, wherein when an instruction from the user is inputted to the motion picture reproducing apparatus, the priority storage means changes the stored priority information.

13. The middleware selecting and executing device for motion picture reproduction according to claim 11, further comprising priority changing means for changing the priority information stored in the priority storage means into new priority information provided by the broadcast station.

14. The middleware selecting and executing device for motion picture reproduction according to claim 13, wherein the broadcast station further sends out an operation stream containing the new priority information, a priority changing program, and program identification information, and the priority changing means is implemented by the motion picture reproducing apparatus receiving the operation stream and operating, based on the program identification information, the priority changing program on middleware applicable to the priority changing program.

15. The middleware selecting and executing device for motion picture reproduction according to claim 1, wherein when the motion picture stream contains a plurality of programs corresponding to different broadcast services, the motion picture reproducing apparatus selects any one of the broadcast services and operates a program corresponding to the broadcast service, and the device further comprises a service switch detecting means for detecting, with the program that corresponds to the broadcast service operating on middleware applicable to the program, that the program instructs the motion picture reproducing apparatus to switch to another broadcast service, and requesting the selecting means to select middleware applicable to a program corresponding to the other broadcast service.

16. The middleware selecting and executing device for motion picture reproduction according to claim 1, wherein when the middleware being executed is terminated the executing means releases resources allocated for the middleware.

17. In a motion picture reproducing apparatus that reproduces motion pictures by receiving a motion picture stream containing motion picture data, a program, and program identification information sent out from a broadcast station, and operating the program on middleware based on the program identification information to process the motion picture data, a method of selectively executing middleware applicable to the program to make the program operable, the method comprising:

a middleware storing step of storing a plurality of pieces of middleware that are different from each other;

a selecting step of selecting, based on the program identification information in the motion picture stream received by the motion picture reproducing apparatus, the middleware applicable to the program in the motion picture stream;

a reading step of reading the middleware selected in the selecting step from the plurality of pieces of middleware stored in the middleware storing step; and an executing step of executing the middleware read in the reading step.

18. In a motion picture reproducing apparatus that reproduces motion pictures by receiving a motion picture stream containing motion picture data, a program, and program identification information sent out from a broadcast station, and operating the program on a middleware selecting and executing program being dedicated to the motion picture reproducing apparatus and having a method computer-readably written therein, the method of selectively executing middleware applicable to the program to make the program operable, the middleware selecting and executing program comprising:

a middleware storing step of storing a plurality of pieces of middleware that are different from each other;

a selecting step of selecting, based on the program identification information in the motion picture stream received by the motion picture reproducing apparatus, the middleware applicable to the program in the motion picture stream;

a reading step of reading the middleware selected in the selecting step from the middleware storing step; and an executing step of executing the middleware read in the reading step.

19. In a motion picture reproducing apparatus that reproduces motion pictures by receiving a motion picture stream containing motion picture data, a program, and program identification information sent out from a broadcast station, and operating the program on middleware based on the program identification information to process the motion picture data, a recording medium storing a middleware selecting and executing program being dedicated to the motion picture reproducing apparatus and having a method computer-readably written therein, the method of selectively executing middleware applicable to the program to make the program operable, the middleware selecting and executing program comprising:

a middleware storing step of storing a plurality of pieces of middleware that are different from each other;

a selecting step of selecting, based on the program identification information in the motion picture stream received by the motion picture reproducing apparatus, the middleware applicable to the program in the motion picture stream;

a reading step of reading the middleware selected in the selecting step from the plurality of pieces of middleware stored in the middleware storing step; and an executing step of executing the middleware read in the reading step.

\* \* \* \* \*

UNITED STATES PATENT AND TRADEMARK OFFICE
CERTIFICATE OF CORRECTION

PATENT NO.   : 6,876,434 B2
DATED        : April 5, 2005
INVENTOR(S)  : Yoshio Kawakami et al.

It is certified that error appears in the above-identified patent and that said Letters Patent is hereby corrected as shown below:

Column 26,
Line 51, after "on a middleware" insert -- based on the program identification information to process the motion picture data, a middleware --;
Line 66, after "step from" insert -- the plurality of pieces of middleware stored in --.

Signed and Sealed this

Third Day of January, 2006

JON W. DUDAS
*Director of the United States Patent and Trademark Office*